(12) United States Patent
Akizuki et al.

(10) Patent No.: US 12,283,653 B2
(45) Date of Patent: Apr. 22, 2025

(54) SECONDARY BATTERY AND METHOD FOR MANUFACTURING THE SAME

(71) Applicant: Murata Manufacturing Co., Ltd., Nagaokakyo (JP)

(72) Inventors: Naoto Akizuki, Nagaokakyo (JP); Yusuke Tanji, Nagaokakyo (JP); Keisuke Nishimoto, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 744 days.

(21) Appl. No.: 17/487,640

(22) Filed: Sep. 28, 2021

(65) Prior Publication Data

US 2022/0029247 A1 Jan. 27, 2022

Related U.S. Application Data

(63) Continuation of application No. PCT/JP2020/013272, filed on Mar. 25, 2020.

(30) Foreign Application Priority Data

Mar. 29, 2019 (JP) ................ 2019-067836

(51) Int. Cl.
*H01M 50/463* (2021.01)
*H01M 10/0525* (2010.01)
(Continued)

(52) U.S. Cl.
CPC ... *H01M 10/0525* (2013.01); *H01M 10/0587* (2013.01); *H01M 50/469* (2021.01); *H01M 50/103* (2021.01)

(58) Field of Classification Search
CPC ........... H01M 10/0525; H01M 50/469; H01M 10/0587; H01M 50/103
(Continued)

(56) References Cited

U.S. PATENT DOCUMENTS 10,741,879 B2 8/2020 Inoue et al.
2017/0317387 A1 11/2017 Inoue et al.
(Continued)

FOREIGN PATENT DOCUMENTS

JP 2013164967 A 8/2013
JP 2016115410 A 6/2016
(Continued)

OTHER PUBLICATIONS

English language machine translation of "Poedr Storage Element and Method of Manufacturing the Same" by Kawate Kenji in JP2016-115410(A)—Jun. 23, 2016 (Year: 2016).*

(Continued)

*Primary Examiner* — Jonathan G Jelsma
*Assistant Examiner* — Omar M Kekia
(74) *Attorney, Agent, or Firm* — ArentFox Schiff LLP

(57) ABSTRACT

A secondary battery that includes a wound electrode assembly in which a positive electrode, a negative electrode, and a separator disposed between the positive electrode and the negative electrode are wound about a winding axis; and a current collecting tab at a first end of the wound electrode assembly along a direction of the winding axis, wherein the wound electrode assembly has a separator extension portion in which the separator extends more than the positive electrode and the negative electrode toward a second end of the wound electrode assembly along the direction of the winding axis, the second end being opposite the first end, and the separator has a bent shape that protrudes toward an outer peripheral side of the wound electrode assembly at least at a part of the separator extension portion in a sectional view passing through the winding axis.

20 Claims, 15 Drawing Sheets

(51) Int. Cl.
  *H01M 10/0587* (2010.01)
  *H01M 50/469* (2021.01)
  *H01M 50/103* (2021.01)

(58) Field of Classification Search
  USPC .......................................................... 429/94
  See application file for complete search history.

(56) References Cited

U.S. PATENT DOCUMENTS

2020/0052265 A1* 2/2020 Wakimoto .......... H01M 50/533
2021/0050586 A1* 2/2021 Nishino ............ H01M 10/0587

FOREIGN PATENT DOCUMENTS

WO   2016063835 A1   4/2016
WO   2018123088 A1   7/2018

OTHER PUBLICATIONS

International Search Report issued in PCT/JP2020/013272, dated Jun. 16, 2020.
Written Opinion of the International Search Report issued in PCT/JP2020/013272, dated Jun. 16, 2020.

* cited by examiner

FIG. 17 - PRIOR ART
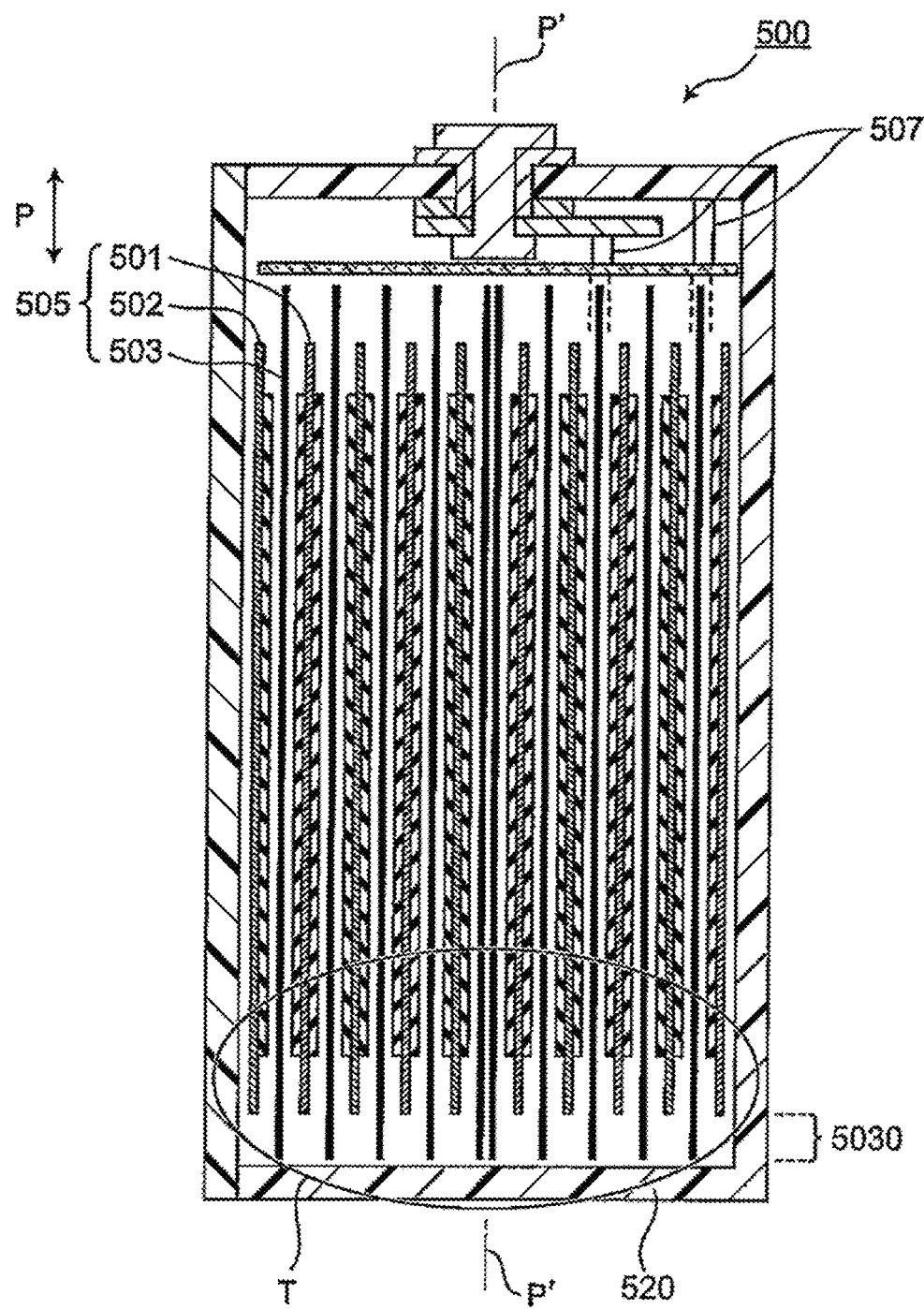

SECONDARY BATTERY AND METHOD FOR MANUFACTURING THE SAME

CROSS REFERENCE TO RELATED APPLICATIONS

The present application is a continuation of International application No. PCT/JP2020/013272, filed Mar. 25, 2020, which claims priority to Japanese Patent Application No. 2019-067836, filed Mar. 29, 2019, the entire contents of each of which are incorporated herein by reference.

FIELD OF THE INVENTION

The present invention relates to a secondary battery and a method for manufacturing the same.

BACKGROUND OF THE INVENTION

Secondary batteries have been conventionally used as power sources for various electronic devices. A secondary battery generally has a structure in which an electrode assembly (electrode body) and an electrolyte are housed in an exterior body (case), and further includes an external terminal for achieving electrical connection of the secondary battery.

As an electrode assembly, as shown in FIG. 17 for example, a wound electrode assembly 505 in which a positive electrode 501, a negative electrode 502, and a separator 503 disposed between the positive electrode and the negative electrode are wound is known. For the wound electrode assembly 505, a current collecting tab 507 is disposed at one end in the direction of a winding axis P'. In a structure in which such a wound electrode assembly 505 is housed in an exterior body 520 as shown in FIG. 17, when an impact is applied to the battery, stress concentrates between an end portion T of the wound electrode assembly 505 and the exterior body 520, and short circuit may occur between the positive electrode and the negative electrode.

Therefore, a technique is disclosed in which a separator is extended much longer than the positive electrode and the negative electrode at the end portion T of the other end opposite to one end having the current collecting tab 507 in the direction of the winding axis P' in the wound electrode assembly 505, to form a buffer portion that absorbs impact (Patent Document 1). In such a technique, a separator extension portion 5030 is bent in one direction (for example, in the thickness direction of the flat column shape of the wound electrode assembly) to form the buffer portion that absorbs impact.

Patent Document 1: Japanese Patent Application Laid-Open No. 2013-164967

SUMMARY OF THE INVENTION

The inventors of the present invention have found that the buffer portion formed by bending the separator extension portion in one direction (that is, the thickness direction) cannot sufficiently absorb impact. The inventors have also found that there is a risk that the electrode is exposed in the secondary battery and a risk that the separator is caught between members constituting the exterior body when the exterior body is sealed because the buffer portion is formed by simply bending the separator extension portion in one direction (that is, the thickness direction).

An object of the present invention is to provide a secondary battery that absorbs impact more sufficiently and a method for manufacturing the secondary battery.

An object of the present invention is to provide a secondary battery in which not only impact is more sufficiently absorbed, but also a risk that an electrode is exposed in the secondary battery and a risk that a separator is caught between constituent members of an exterior body are more sufficiently reduced, and a method for manufacturing the secondary battery.

The present invention relates to a secondary battery including: a wound electrode assembly in which a positive electrode, a negative electrode, and a separator disposed between the positive electrode and the negative electrode are wound about a winding axis; and a current collecting tab at a first end of the wound electrode assembly along a direction of the winding axis, wherein the wound electrode assembly has a separator extension portion in which the separator extends more than the positive electrode and the negative electrode toward a second end of the wound electrode assembly along the direction of the winding axis, the second end being opposite the first end, and the separator has a bent shape that protrudes toward an outer peripheral side of the wound electrode assembly at least at a part of the separator extension portion in a sectional view passing through the winding axis.

The present invention also relates to a method for manufacturing a secondary battery, the method including, in a precursor of a wound electrode assembly obtained by winding a positive electrode, a negative electrode, and a separator disposed between the positive electrode and the negative electrode, bringing a heater block into contact along an axial direction of the precursor of the wound electrode assembly with a separator extension portion in which the separator extends more than the positive electrode and the negative electrode.

The secondary battery of the present invention absorbs impact more sufficiently.

In the secondary battery of the present invention, a risk that the electrode is exposed in the secondary battery and a risk that the separator is caught between the constituent members of the exterior body are more sufficiently reduced.

BRIEF DESCRIPTION OF THE DRAWINGS

FIG. 17 is a schematic conceptual view of a secondary battery according to a conventional technique, which is a schematic sectional view passing through a winding axis of a wound electrode assembly constituting the secondary battery.

DETAILED DESCRIPTION OF THE INVENTION

Figure 1:
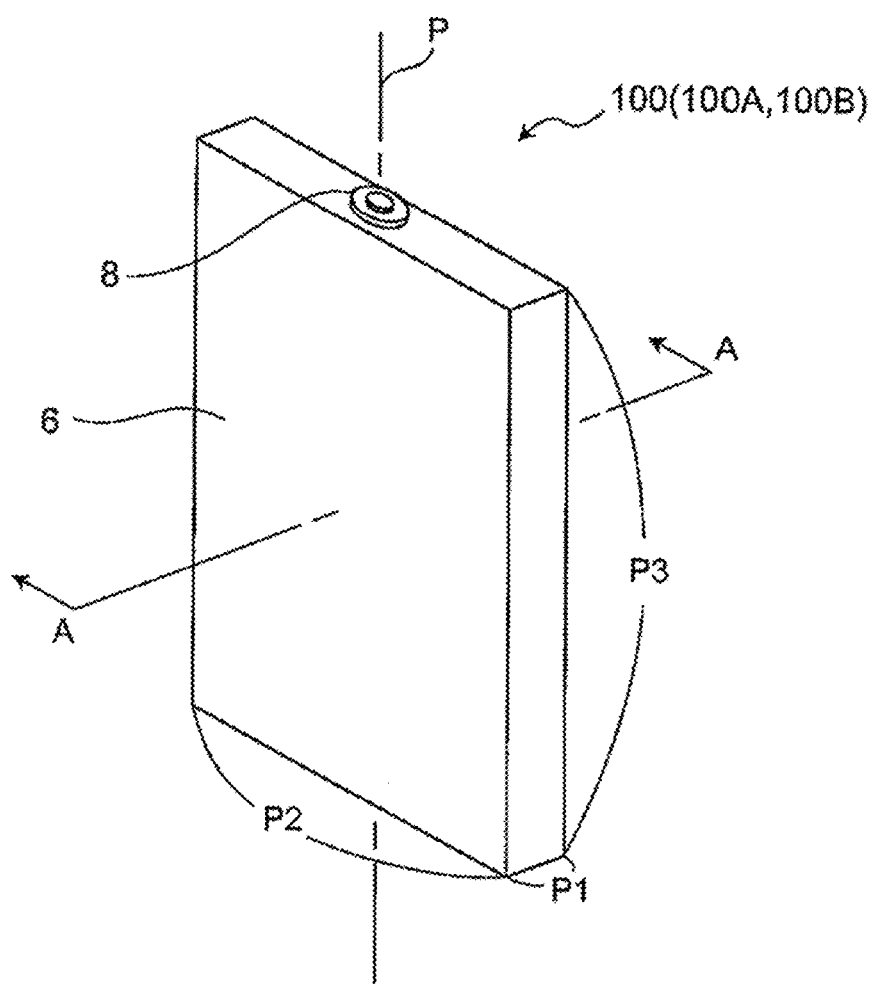
FIG. 1 is a schematic perspective view showing an appearance of one example of a secondary battery of the present invention.

[Secondary Battery and Method for Manufacturing the Same]

The present invention provides a secondary battery. In the present specification, the term "secondary battery" refers to a battery that can be repeatedly charged and discharged. The "secondary battery" is not excessively limited by its name, and may include, for example, an electrochemical device such as a "power storage device".

Hereinafter, a secondary battery of the present invention and a method for manufacturing the same will be described in detail with reference to drawings showing some embodiments. The term "sectional view" used in the present specification refers to a sectional state (sectional view) when seen from a direction substantially perpendicular to a winding axis of a wound electrode assembly constituting a secondary battery. In particular, when the wound electrode assembly has a flat column shape as described later, the "sectional view" refers to a sectional state (sectional view) when seen from a direction substantially perpendicular to a winding axis of the wound electrode assembly such that the section has a minimum area. In the present specification, various elements in the drawings are merely shown schematically and exemplarily for the understanding of the present invention, and appearance, dimensional ratios, and the like may be different from actual ones. In the present specification, "vertical direction", "horizontal direction", and "front and back direction" used directly or indirectly correspond to directions corresponding to the vertical direction, the horizontal direction, and the front and back direction in the drawings, respectively, unless otherwise specified. The same reference sign or symbol indicates the same member or the same meaning except that the shape is different unless otherwise specified.

First Embodiment

A secondary battery 100A of the present embodiment includes a positive electrode 1, a negative electrode 2, and a separator 3 disposed between the positive electrode and the negative electrode, and usually further includes an electrolyte. The secondary battery of the present invention is generally configured such that an electrode assembly 5 including the positive electrode 1, the negative electrode 2, and the separator 3 and an electrolyte (not shown) are enclosed in an exterior body 6.

Figure 2:
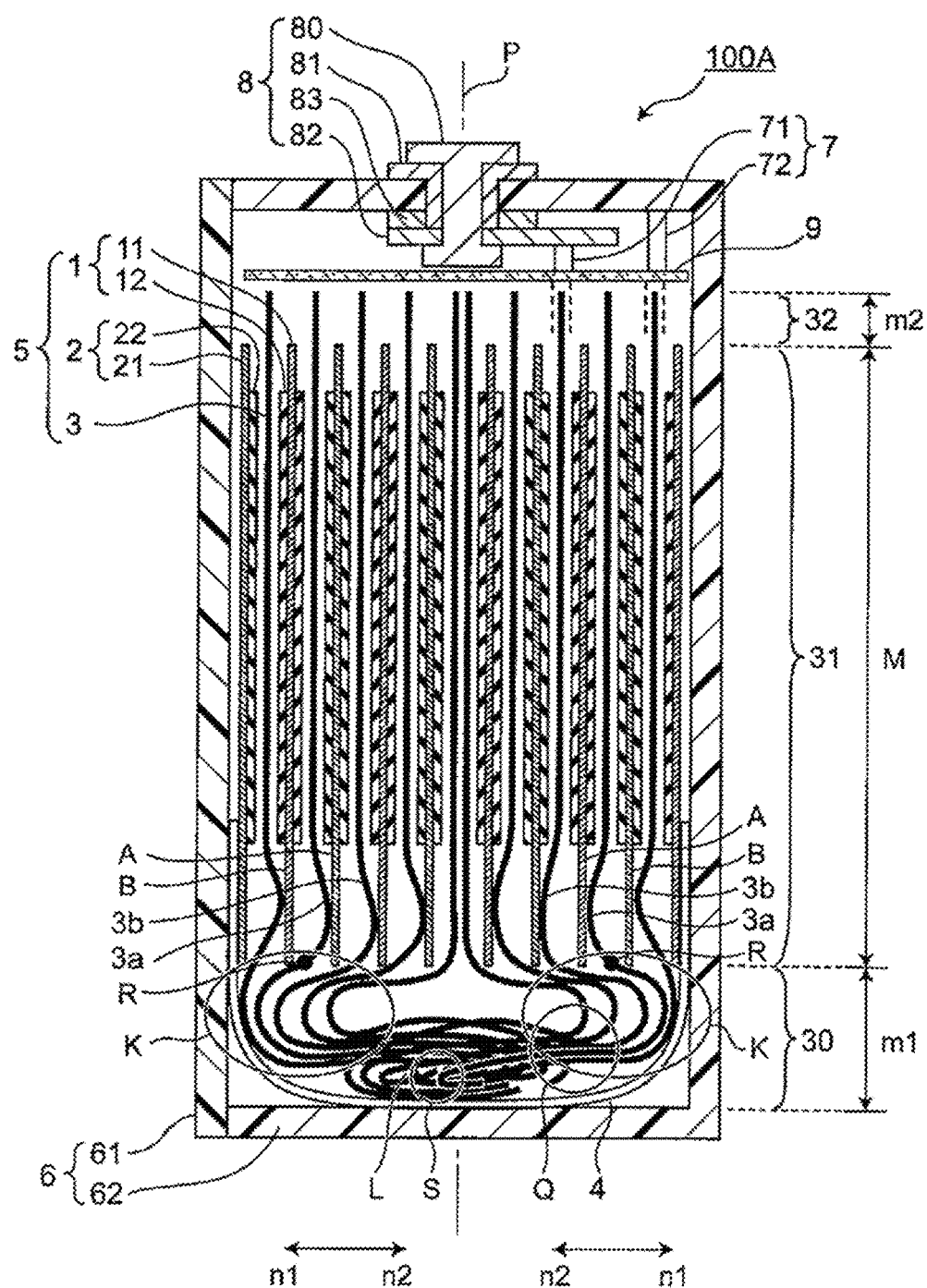
FIG. 2 is a schematic conceptual diagram of a secondary battery according to a first embodiment of the present invention, which is a schematic sectional view passing through a winding axis of a wound electrode assembly constituting the secondary battery in FIG. 1 in which a cross section taken along a line A-A is seen in a direction of the allows.
Figure 3:
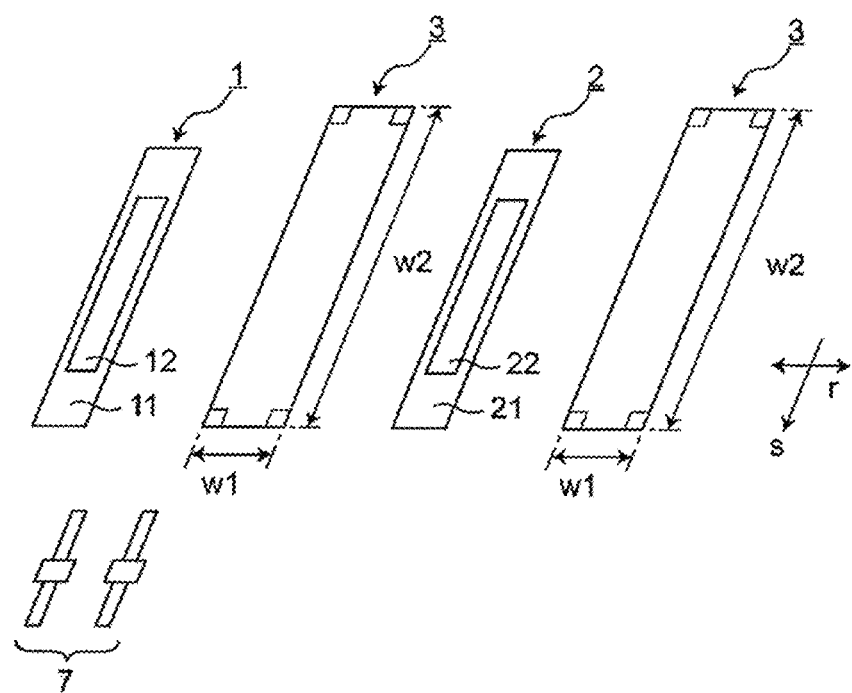
FIG. 3 is a schematic perspective view for explaining constituent members of the wound electrode assembly constituting the secondary battery according to the first embodiment of the present invention.
Figure 4:
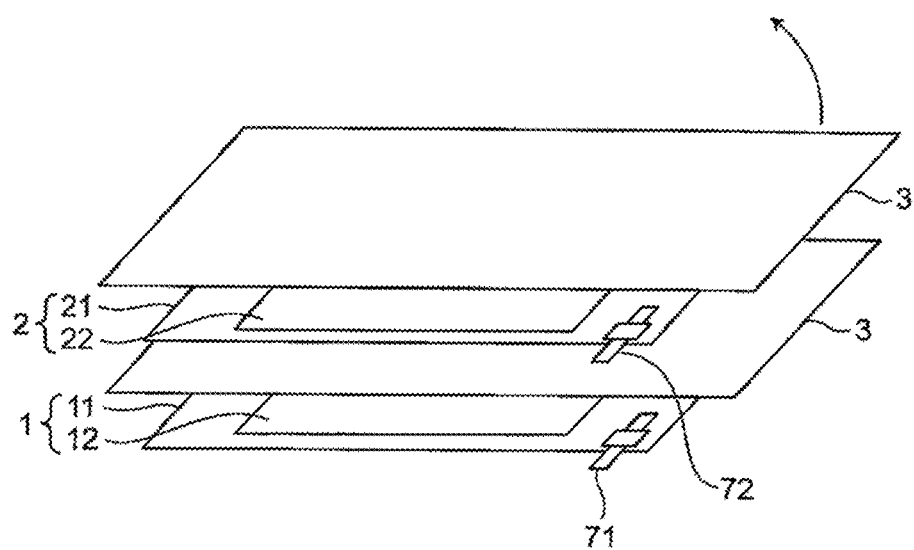
FIG. 4 is a schematic perspective view for explaining a winding method of the wound electrode assembly constituting the secondary battery according to the first embodiment of the present invention.

As shown in FIG. 1 to FIG. 4, the electrode assembly 5 has a wound structure in which the positive electrode 1, the negative electrode 2, and the separator 3 are wound in a roll shape. Specifically, the electrode assembly 5 has a wound structure in which an electrode unit (electrode-constituting layer) including the positive electrode 1, the negative electrode 2, and the separator 3 disposed between the positive electrode and the negative electrode is wound in a roll shape. When the electrode assembly 5 has such a wound structure, the secondary battery including the electrode assembly is referred to as a "wound secondary battery". The wound structure may also be referred to as a jelly roll type structure. FIG. 1 is a schematic perspective view showing an appearance of one example of a secondary battery of the present invention. FIG. 2 is a schematic conceptual diagram of a secondary battery according to a first embodiment of the present invention, which is a schematic sectional view passing through a winding axis of a wound electrode assembly constituting the secondary battery in FIG. 1 in which a cross section taken along a line A-A is seen in a direction of the allows. FIG. 3 is a schematic perspective view for explaining constituent members of the wound electrode assembly constituting the secondary battery according to the first embodiment of the present invention. FIG. 4 is a schematic perspective view for explaining a winding method of the wound electrode assembly constituting the secondary battery according to the first embodiment of the present invention.

The electrode assembly 5 has a substantially flat column shape in FIG. 1 and FIG. 2, and may have a substantially cylindrical shape. The substantially flat column shape is, for example, a shape that can be obtained by pressing a substantially cylindrical shape in a diametrical direction thereof, and includes a substantially elliptic column shape.

In the electrode assembly 5, a current collecting tab 7 is disposed at one end in the direction of a winding axis P. The current collecting tab 7 includes a positive electrode current collecting tab 71 and a negative electrode current collecting tab 72. The positive electrode current collecting tab 71 is electrically connected to the external terminal structure 8, and is led out to the outside with the external terminal structure 8 interposed between the tab and the outside. The external terminal structure 8 is not particularly limited, and for example, may be fitted and inserted into a through hole of an exterior body 6. Specifically, the external terminal structure 8 includes a conductive rivet portion 80 for mainly leading an electrode to the outside, an external gasket portion 81 for preventing electrolyte leakage while ensuring electrical insulation between the conductive rivet portion 80 and the exterior body 6, an internal tab 82 for ensuring electrical connection between the conductive rivet portion 80 and the current collecting tab 7, and an internal gasket portion 83 for preventing electrolyte leakage while ensuring electrical insulation between the internal tab 82 and the exterior body 6. The negative electrode current collecting tab 72 is electrically connected to the exterior body 6, and is led out to the outside with the exterior body 6 interposed between the tab and the outside. The winding axis P may be an axis that divides a thickness p1 and a depth p2 of the secondary battery 100A in two and may be parallel to a height p3 direction.

In FIG. 2, the positive electrode current collecting tab 71 is electrically connected to the external terminal structure 8. However, the negative electrode current collecting tab 72 may be electrically connected to the external terminal structure 8. At this time, the positive electrode current collecting tab 71 may be in contact with and electrically connected to the inside of the exterior body 6.

In FIG. 2, the negative electrode current collecting tab 72 is electrically connected to the inside of the exterior body 6. However, one of the positive electrode current collecting tab 71 and the negative electrode current collecting tab 72 may be electrically connected to the inside of the exterior body. At this time, the exterior body 6 has the same polarity as the polarity of the current collecting tab in contact with the inside of the exterior body 6. When the exterior body 6 has non-conductivity, the tab may be led out to the outside with a new external terminal structure disposed between the tab and the outside.

From the viewpoint of voltage balance, the positive electrode current collecting tab 71 is preferably electrically connected to the external terminal structure 8, and the negative electrode current collecting tab 72 is preferably electrically connected to the inside of the exterior body 6.

As shown in FIG. 2, the electrode assembly 5 has a separator extension portion 30 at the other end opposite to one end having the current collecting tab 7 in the direction of the winding axis P. As shown in FIG. 2, the electrode assembly 5 usually has a separator extension portion 32 also at one end having the current collecting tab 7 in the direction of the winding axis P. Each of the separator extension portions 30 and 32 is a portion where the separator 3 extends longer than the positive electrode 1 and the negative electrode 2 in the direction of the winding axis P. Hereinafter, the separator extension portion 30 may be simply referred to as a "bottom extension portion 30" and the separator extension portion 32 may be simply referred to as a "top extension portion 32". The bottom and the top are bottom and top, respectively, when it is assumed that the secondary battery 100A is disposed such that the winding axis P of the wound electrode assembly 5 inside the secondary battery is parallel to the vertical direction and the terminal structure 8 described later is positioned higher. The secondary battery 100A may be disposed such that the winding axis P of the wound electrode assembly 5 inside the secondary battery is parallel to the horizontal direction.

In the present embodiment, the separator 3 has a bent shape protruding toward an outer peripheral side n1 of the winding in at least a part of the bottom extension portion 30 in a sectional view passing through the winding axis P, and forms a flexible molded body as the bottom extension portion 30. The "bent shape protruding toward an outer peripheral side n1" means a bent shape protruding from an inner peripheral side n2 toward the outer peripheral side n1. The bent shape is a shape in which the separator 3 is, toward its tip, firstly bent toward the outer peripheral side (that is, the outer peripheral direction n1) of the winding and then secondly bent toward the inner peripheral side (that is, the inner peripheral direction n2) of the winding in the bottom extension portion 30. A region having a bent shape in the bottom extension portion 30 is indicated by "K" in FIG. 2. Such a region may also be referred to as a "regular region" because the separators 3 are arranged having a substantially regular bent shape. Bend encompasses curve and fold. As shown in the region K in FIG. 2, the curve is to bend in a sweep shape (or arcuate shape) (that is, to bend substantially curvaceously), which results in a rounded curve and also includes a flexure. The fold is to bend at a shape angle (that is, to bend substantially linearly). The "bend" is preferably a "curve" from the viewpoint of further improving the impact absorbability of the bottom extension portion 30.

The separator 3 forms a flexible molded body having the above-described bent shape at the bottom extension portion 30. Thus, the bottom extension portion 30 serves as an impact absorbing material, and can more sufficiently absorb impact (for example, impact to the bottom extension portion 30 from the exterior body 6 in the direction along the winding axis P) propagated from the outside into the secondary battery. Furthermore, the risk that the electrode is exposed in the secondary battery is sufficiently reduced, and the risk that the separator is caught between the constituent members of the exterior body at the time of sealing the exterior body is more sufficiently reduced. Moreover, such a bottom extension portion 30 more sufficiently contributes to the holding of an electrolyte. FIG. 16 is a micrograph of the vicinity of the bottom extension portion 30 in the secondary battery of the present embodiment. From FIG. 16, it is apparent that the separator 3 has a bent shape protruding toward the outer peripheral side of the winding at a part of the bottom extension portion 30, and forms a flexible molded body as the bottom extension portion 30. In FIG. 2, gaps are shown between various elements such as between the positive electrode 1 and the separator 3 and between the negative electrode 2 and the separator 3. These gaps are merely shown for understanding the present invention, and do not have to exist in an actual product. The gaps between various elements in FIG. 5 to FIG. 9 and FIG. 12 to FIG. 15 are the same as the gaps in FIG. 2.

The separator 3 includes a main body portion 31 adjacent to the bottom extension portion 30 in the direction of the winding axis P and is disposed between the positive electrode 1 and the negative electrode 2. The separator 3 is preferably bent toward the outer peripheral side n1 of the winding at the boundary between the bottom extension portion 30 and the main body portion 31 from the viewpoint of further improving the impact absorbability of the bottom extension portion 30 and more sufficiently reducing the risk of exposure of the electrode in the secondary battery and the risk of catching of the separator between the constituent members of the exterior body. In other words, it is preferable that the bending toward the outer peripheral side n1 of the winding in the bent shape of the separator 3 has already started at the boundary between the bottom extension portion 30 of the separator 3 and the main body portion 31.

The electrode assembly 5 includes a plurality of separators 3 in appearance, for example in a sectional view passing through the winding axis P as shown in FIG. 2. From the viewpoint of further improving the impact absorbability of the bottom extension portion 30 and more sufficiently reducing the risk of exposure of the electrode in the secondary battery and the risk of catching the separator between the constituent members of the exterior body, the plurality of separators 3 are preferably arranged to overlap each other between the adjacent separators in the direction of the winding axis P of the electrode assembly 5 in the region K having the bent shape in the bottom extension portion 30 as shown in FIG. 2. The expression "overlap each other in the direction of the winding axis P" means that, in the region K having the bent shape in the bottom extension portion 30 as shown in FIG. 2, two adjacent separators overlap each other such that the separator disposed on the more outer peripheral side wraps the separator disposed on the more inner peripheral side. Specifically, when the separator (in particular, the bent portion thereof) disposed on the more inner peripheral side of the two adjacent separators is for example moved (for example, moved upward) in parallel to the direction of the winding axis P, the movement is disturbed by the bent portion of the separator disposed on the more outer peripheral side. Such mutual overlapping between two adjacent separators preferably occurs between all two adjacent separators, but is not limited thereto, and may occur at least between two adjacent separators in the central portion on each of both sides of the winding axis P. For example, when an odd number (5 in FIG. 2) of electrodes are included on both sides of the winding axis P as shown in FIG. 2, the two separators adjacent to each other in the central portion are, on each of both sides, a separator 3a disposed between an electrode (one of the positive electrode and the negative electrode) A at the central portion and an electrode (the other of the positive electrode and the negative electrode) B adjacent to the electrode and disposed on the outer peripheral side n1, and a separator 3b adjacent to the separator 3a and disposed on the inner peripheral side n2. For example, when an even number of electrodes are included on both sides of the winding axis P, the two separators adjacent to each other at the central portion are, on each of the both sides, a separator disposed between the two electrodes at the central portion and a separator adjacent to the separator and disposed on the inner peripheral side n2. In the region K having a bent shape in the bottom extension portion 30, the separator (for example, 3a) arranged on the more outer peripheral side and the separator (for example, 3b) arranged on the more inner peripheral side may be in contact with each other in part, and a space (that is, a space filled with the electrolyte) may be interposed between them. The two adjacent separators may overlap each other such that the separator (for example, 3a) disposed on the more outer peripheral side wraps the separator (for example, 3b) disposed on the more inner peripheral side while being in contact with the separator at a larger number of portions (for example, all surfaces).

In a sectional view passing through the winding axis P as shown in FIG. 2, not all of the separators 3 have to have a bent shape in the bottom extension portion 30. At least a part of the separator may have a bent shape at the bottom extension portion 30. From the viewpoint of further improving the impact absorbability of the bottom extension portion 30 and more sufficiently reducing the risk of exposure of the electrode in the secondary battery and the risk of catching the separator between the constituent members of the exterior body, when an odd number (5 in FIG. 2) of electrodes are included in the electrode assembly 5 on both sides of the winding axis P as shown in FIG. 2 for example, it is preferable that the separator 3a disposed between an electrode (one of the positive electrode and the negative electrode) A at the central portion and an electrode (the other of the positive electrode and the negative electrode) B adjacent to the electrode and disposed on the outer peripheral side n1 has a bent shape in the bottom extension portion 30 on each of the both sides. For example, when an even number of electrodes are included on both sides of the winding axis P, it is preferable that the separator 3 disposed between the two electrodes at the central portion has a bent shape at the bottom extension portion 30 on each of both sides. From the viewpoint of further improving the impact absorbability of the bottom extension portion 30 and more sufficiently reducing the risk of exposure of the electrode in the secondary battery and the risk of catching the separator between the constituent members of the exterior body, in a desirable aspect, preferably no less than 30%, more preferably no less than 50%, and still more preferably no less than 80% of the number of the separators 3 in a sectional view passing through the winding axis P have a bent shape in the bottom extension portion 30.

The bottom extension portion 30 may have an irregular region L in which the separators 3 are not regularly arranged together with the regular region K in which the separators 3 are arranged having a substantially regular bent shape in a sectional view passing through the winding axis P. The irregular region L is disposed closer to the tip of the separator 3 than the regular region K in the bottom extension portion 30 is.

From the viewpoint of further improving the impact absorbability of the bottom extension portion 30 in the sectional view (in particular, the region K having the bent shape) passing through the winding axis P, it is preferable that the separator 3 is, in the bottom extension portion 30, once bent to the outer peripheral side n1 of the winding, then bent to the inner peripheral side n2, and then extended toward the inner peripheral side n2 beyond a boundary point R between the extension portion 30 and the main body portion 31 in the separator 3, as shown in FIG. 2. It is preferable that all the separators have such an extension form of the separator 3, but the separator is not limited thereto, and at least the separator at the central portion may have the extension form on each of both sides of the winding axis P. For example, when an odd number (5 in FIG. 2) of electrodes are included on both sides of the winding axis P as shown in FIG. 2, the separator at the central portion is a separator 3a disposed between a central electrode (one of the positive electrode and the negative electrode) A and an electrode (the other of the positive electrode and the negative electrode) B adjacent to the electrode and disposed on the outer peripheral side n1 on each of the both sides. In FIG. 2, the extension form of the separator 3a on the right side with respect to the winding axis P is shown in a region Q. For example, when an even number of electrodes are included on both sides of the winding axis P, the separator at the central portion is a separator disposed between two electrodes at the center on each of both sides.

From the viewpoint of further improving the impact absorbability of the bottom extension portion 30 in the sectional view passing through the winding axis P, the separator 3 preferably extends toward the inner peripheral side beyond the boundary point R as described above and then further extends beyond the winding axis P as shown in FIG. 2. It is preferable that all the separators have such a further extension form of the separator 3, but the separator is not limited thereto, and it is sufficient that at least the separator at the central portion has the further extension form on each of both sides of the winding axis P. The separator at the central portion is the above-described separator 3a on each of both sides, for example, when an odd number (5 in FIG. 2) of electrodes are included on both sides of the winding axis P as shown in FIG. 2. In FIG. 2, the further extension form of the separator 3a on the right side with respect to the winding axis P is shown in a region S. The separator at the central portion is the separator disposed between the two electrodes at the center on each of both sides as described above, for example when an even number of electrodes are included on both sides of the winding axis P.

From the viewpoint of further improving the impact absorbability of the bottom extension portion 30 in the sectional view passing through the winding axis P, as shown in FIG. 2, it is preferable that the separator 3 is first bent to the outer peripheral side n1 of the winding at the bottom extension portion 30 (in particular, a region K having a bent shape), then secondly bent to the inner peripheral side n2, and then further thirdly bent to the outer peripheral side n1. It is preferable that all the separators have such a bent form toward the further outer peripheral side n1. The separator is not limited thereto, and at least the separator at the central portion may have such a bent form on each side of the winding axis P. The separator at the central portion is the above-described separator 3a on each of both sides, for example, when an odd number (5 in FIG. 2) of electrodes are included on both sides of the winding axis P as shown in FIG. 2. In FIG. 2, a bending form of the separator 3a on the right side toward the further outer peripheral side n1 with respect to the winding axis P is shown in a region S. The separator at the central portion is the separator disposed between the two electrodes at the center on each of both sides as described above, for example when an even number of electrodes are included on both sides of the winding axis P.

At this time, the bent portion toward the further outer peripheral side n1 is preferably disposed on the side opposite to the side where the boundary point R is present in the separator with respect to the winding axis P as shown in FIG. 2, from the viewpoint of further improving the impact absorbing property of the bottom extension portion 30. That is, in a sectional view passing through the winding axis P, a portion where the separator 3 is further bent toward the outer peripheral side n1 (a further bent portion toward the outer peripheral side n1) is preferably disposed on the side opposite to the side where the boundary point R is present in the separator with respect to the winding axis P. It is preferable that all the separators have such an arrangement form of the further bent portion on the outer peripheral side n1, but the separator is not limited thereto, and at least the separator at the central portion may have the bent portion on each of both sides of the winding axis P. The separator at the central portion is the above-described separator 3a on each of both sides, for example, when an odd number (5 in FIG. 2) of electrodes are included on both sides of the winding axis P as shown in FIG. 2. In FIG. 2, an arrangement form of the further bent portion toward the outer peripheral side n1 of the right separator 3a with respect to the winding axis P is shown in a region S. The separator at the central portion is the separator disposed between the two electrodes at the center on each of both sides as described above, for example when an even number of electrodes are included on both sides of the winding axis P.

A length m1 of the bottom extension portion 30 in the direction of the winding axis P is not particularly limited, and is preferably 2% to 15%, more preferably 2% to 10%, still more preferably 2% to 8%, particularly preferably 3% to 7%, and most preferably 4% to 6% with respect to a length M of the main body portion 31 in the direction of the winding axis, from the viewpoint of the balance between further improving the impact absorbability of the bottom extension portion 30 and improving energy density.

The length m1 of the bottom extension portion 30 in the direction of the winding axis P is usually 0.5 mm to 5 mm, more preferably 0.5 mm to 3 mm, and still more preferably 1 mm to 3 mm.

The length M of the main body portion 31 in the direction of the winding axis of the separator 3 in the electrode assembly 5 is not particularly limited, and may be, for example, 5 mm to 200 mm, more preferably 10 mm to 30 mm, and still more preferably 15 mm to 25 mm.

The electrode assembly 5 preferably includes an insulating tape 4 attached to the bottom extension portion 30 from the viewpoint of more reliably preventing short circuit between the positive electrode and the negative electrode due to impact and more sufficiently reducing the risk of exposure of the electrode in the secondary battery and the risk of catching the separator between the constituent members of the exterior body.

A length m2 of the top extension portion 32 in the direction of the winding axis P is not particularly limited, and is preferably 0.1 mm to 10 mm, more preferably 0.5 mm to 5 mm, and still more preferably 1 mm to 3 mm from the viewpoint of improving energy density.

The length (for example, the depth in FIG. 2) of the electrode assembly 5 in the widthwise direction when the electrode assembly 5 has a flat column shape is not particularly limited, and may be, for example, 5 mm to 100 mm, more preferably 8 mm to 30 mm, and still more preferably 10 mm to 20 mm. In this case, the thickness (for example, the length in the left-right direction in FIG. 2) in the widthwise direction of the electrode assembly 5 is not particularly limited, and may be, for example, 1 mm to 30 mm, more preferably 1 mm to 10 mm, and still more preferably 1 mm to 5 mm.

The diameter of the electrode assembly 5 when the electrode assembly 5 has a cylindrical shape is not particularly limited, and may be, for example, 5 mm to 40 mm, more preferably 8 mm to 30 mm, and still more preferably 10 mm to 20 mm.

The number of windings of the positive electrode 1, the negative electrode 2, and the separator 3 in the electrode assembly 5 may be appropriately determined according to an intended output, size, and the like in the secondary battery. The number of windings may be usually 2 to 100, and may be 3 to 10 for example.

The secondary battery of the present embodiment may be manufactured by the follow manufacturing method:

winding the positive electrode 1, the negative electrode 2, and the separator 3 disposed between the positive electrode and the negative electrode to obtain a precursor of a wound electrode assembly (winding step);

bringing a heater block into contact with a separator extension portion where the separator extends beyond the positive electrode and the negative electrode in the direction of a winding axis in the precursor of the wound electrode assembly to obtain a wound electrode assembly 5 (molding step); and welding a current collecting tab and injecting an electrolyte into the exterior body 6 while housing the wound electrode assembly 5 in the exterior body 6 (assembling step).

Winding Step

Figure 5:
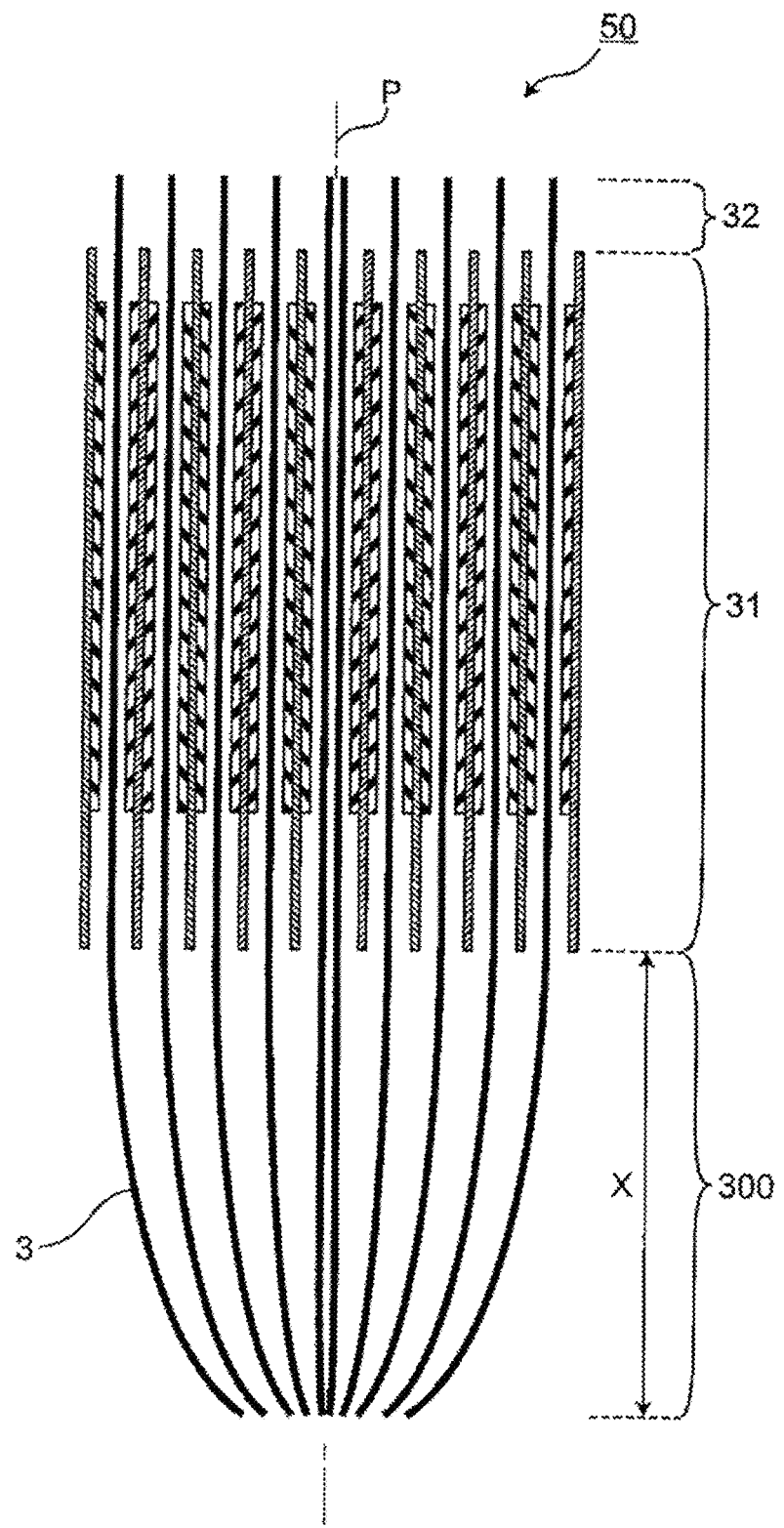
FIG. 5 is a schematic sectional view for explaining a precursor of the wound electrode assembly constituting the secondary battery according to the first embodiment of the present invention.

In this step, as shown in FIG. 3 and FIG. 4, the positive electrode 1, the negative electrode 2, and two of the separators 3 having a rectangular shape are arranged in a predetermined order and wound to obtain a precursor 50 of an electrode assembly as shown in FIG. 5. By applying a predetermined tension to the separators 3 at the time of winding, the precursor 50 in which the separators 3 approach (or converge on) the winding axis P toward the tip of the separator extension portion 300 is obtained. The tension applied to the separators 3 in winding is usually 0.1N to 10N, and preferably 0.5N to 3N from the viewpoint of convergence. In the separator extension portion 300 of the precursor 50 of an electrode assembly, a length x of the separator 3 in the winding axis P direction maintains substantially the same length toward the winding axis P in the winding direction. FIG. 5 is a schematic sectional view for explaining a precursor of the wound electrode assembly constituting the secondary battery according to the first embodiment of the present invention. The "precursor of the wound electrode assembly" refers to an intermediate body or an intermediate structure for obtaining a wound electrode assembly by forming the bottom extension portion in the forming step described later.

The dimensions of the separator 3 to be used are not particularly limited as long as the desired electrode assembly 5 is obtained. For example, the length w1 (see FIG. 3) of the separator 3 in the widthwise direction r is usually 105% to 300%, and particularly 110% to 300%, with respect to the length M in the direction of the winding axis of the main body portion 31 of the separator 3 in the intended electrode assembly 5. For example, the length w2 (see FIG. 3) of the separator 3 in the longitudinal direction s may be appropriately determined according to the dimensions of the intended secondary battery (in particular, the number of windings of the electrode assembly 5).

In this step, the precursor of the wound electrode assembly may be formed into a substantially flat column shape by pressing the precursor in the diameter direction of the wound body as desired. Such pressing may be performed between the molding step and the assembly step described later instead of this step. The pressing is preferably performed between the winding step and the molding step from the viewpoint of further improving the impact absorbability of the bottom extension portion 30 and more sufficiently reducing the risk of exposure of the electrode in the secondary battery and the risk of catching the separator between the constituent members of the exterior body.

Molding Step

Figure 6:
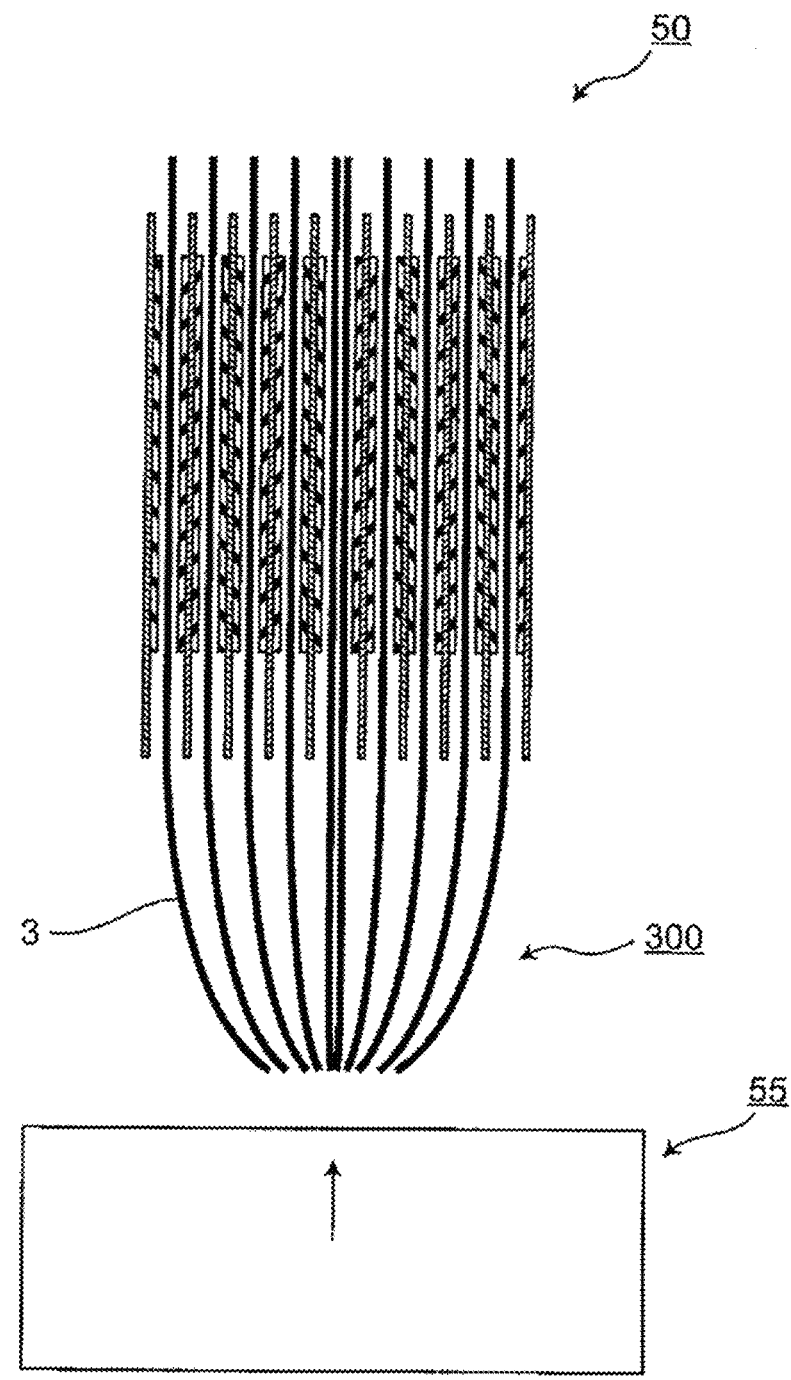
FIG. 6 is a schematic sectional view for explaining a method for manufacturing the wound electrode assembly constituting the secondary battery according to the first embodiment of the present invention.
Figure 7:
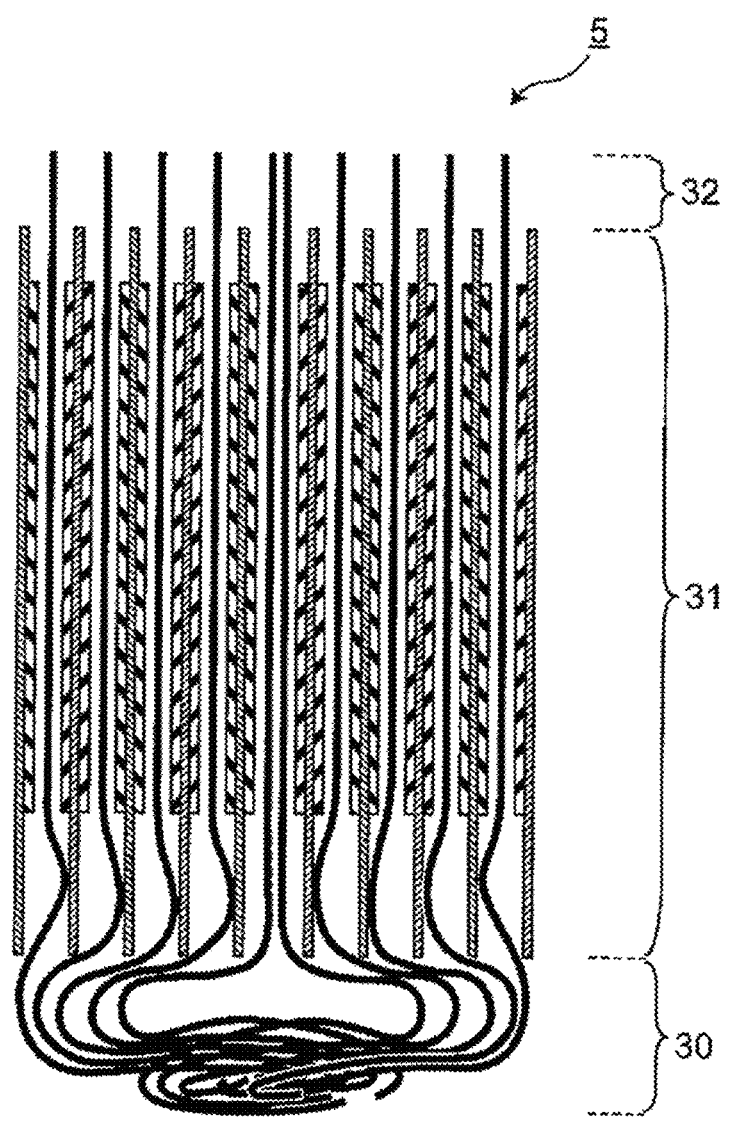
FIG. 7 is a schematic sectional view for explaining the wound electrode assembly constituting the secondary battery according to the first embodiment of the present invention.

In this step, as shown in FIG. 6, in the precursor 50, a heater block 55 is brought into contact with the separator extension portion 300 in which the separator 3 extends more than the positive electrode and the negative electrode in the direction of winding axis to mold the separator extension portion 30, thereby obtaining the wound electrode assembly 5 as shown in FIG. 7. At this time, the heater block 55 is brought into contact with the separator extension portion 300 until the separator extension portion 300 has a flexure. As a result, because the separator 3 melts while appropriately deforming in the separator extension portion 300, it is possible to shape the separator extension portion 300 softly (that is, soft shaping). Soft shaping refers to forming a flexible molded body. As a result, the electrode assembly 5 in which the separator 3 includes the bottom extension portion 30 having the bent shape as described above can be obtained. The resulting bottom extension portion 30 includes a flexible molded body. For example, when a precursor in which the separator 3 does not approach (or converge on) the winding axis P toward the tip of the separator extension portion is used, the separator 3 cannot form the bottom extension portion 30 having the bent shape as described above, and as a result, a flexible molded body as the bottom extension portion 30 cannot be obtained. Further, for example, when a heater (for example, a fan heater, an electric heating wire, or the like) other than the heater block is used, the separator 3 cannot form the bottom extension portion 30 having the bent shape as described above, and as a result, a flexible molded body cannot be obtained as the bottom extension portion 30. FIG. 6 is a schematic sectional view for explaining a method for manufacturing the wound electrode assembly constituting the secondary battery according to the first embodiment of the present invention (in particular, a molding step). FIG. 7 is a schematic sectional view for explaining the wound electrode assembly constituting the secondary battery according to the first embodiment of the present invention.

The surface temperature of the heater block 55 is usually Mp−30(° C.) to Mp+30° C. when Mp(° C.) is the melting point of the polymer material constituting the separator 3, and is preferably Mp−30(° C.) to Mp+20° C., more preferably Mp−30° C. to Mp+15° C. from the viewpoint of further improving the impact absorbability of the bottom extension portion 30 and more sufficiently reducing the risk of exposure of the electrode in the secondary battery and the risk of catching of the separator between the constituent members of the exterior body. When the surface temperature of the heater block is too high, melting of the separator 3 starts before the separator 3 bends when the heater block 55 approaches the separator extension portion 300, then the separator 3 cannot form the bottom extension portion 30 having the bent shape as described above, and as a result, a flexible molded body cannot be obtained. When the surface temperature of the heater block is too low, fusion between the separators 3 does not proceed, then the separator 3 cannot form the bottom extension portion 30 having the bent shape as described above, and as a result, a flexible molded body cannot be obtained.

Figure 8:
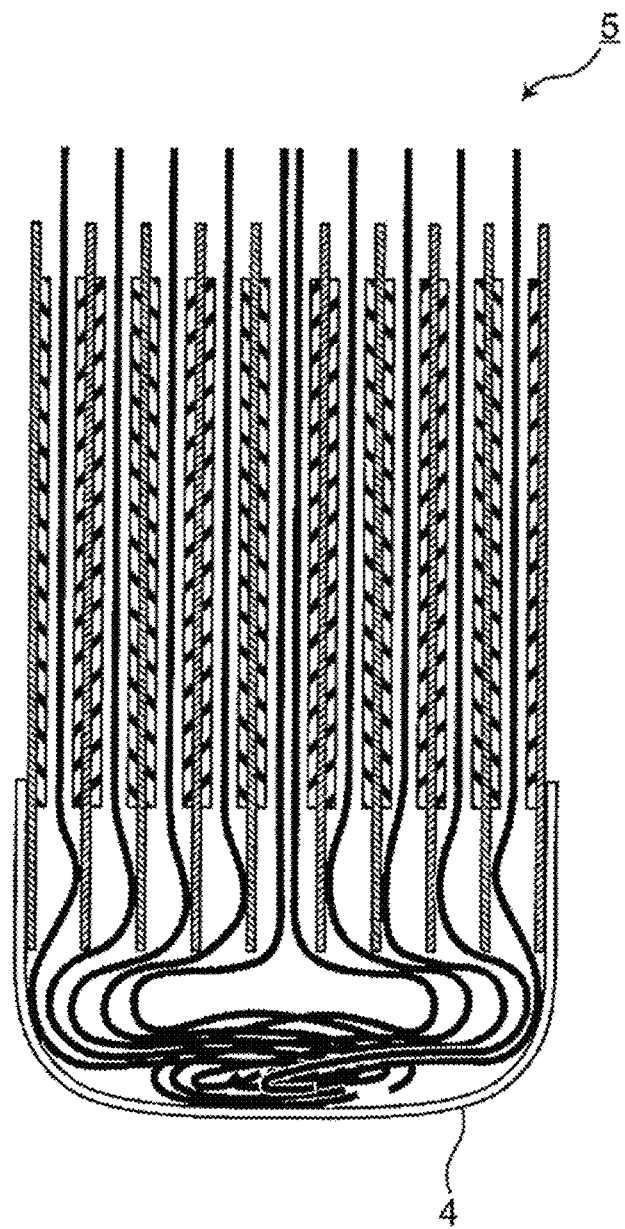
FIG. 8 is a schematic sectional view for explaining a wound electrode assembly with an insulating tape constituting the secondary battery according to the first embodiment of the present invention.

As shown in FIG. 8, an insulating tape 4 is usually attached to the separator extension portion 30 of the electrode assembly 5. At this time, it is extremely easy to attach the insulating tape 4 because the bottom extension portion 30 is formed as a flexible molded body. Moreover, not only short circuit between the positive electrode and the negative electrode due to impact can be more reliably prevented, but also a risk of exposure of the electrode in the secondary battery and a risk of catching of the separator between the constituent members of the exterior body can be more sufficiently reduced. FIG. 8 is a schematic sectional view for explaining a wound electrode assembly with an insulating tape constituting the secondary battery according to the first embodiment of the present invention.

Assembly Step

The current collecting tab 7 is welded and the electrolyte is injected into the exterior body 6 while the electrode assembly 5 obtained in the previous step is housed in the exterior body 6. When the exterior body 6 includes two members (for example, a lid portion 61 and a main body portion 62) as described later, for example, the electrode assembly 5 is housed and the current collecting tab 7 is welded, then the two members are welded, after that an electrolyte may be injected from an injection port (not shown), and the injection port may be closed by a sealing plug (not shown), for example. The welding of the current collecting tab 7, the welding of the two members as the exterior material 6, and the closing by the sealing plug may be achieved by any method known in the field of secondary batteries, and for example, a laser welding method may be used. When the secondary battery includes a spacer 9 as shown in FIG. 2 from the viewpoint of securing insulation between the electrode assembly 5 and the terminal structure 8, the spacer 9 may also be housed when the electrode assembly 5 is housed in the exterior body 6.

Constituent Material of Secondary Battery

The positive electrode 1 is formed of at least a positive electrode material layer 12 and a positive electrode current collector (foil) 11, and the positive electrode material layer may be provided on at least one surface of the positive electrode current collector 11. For example, in the positive electrode 1, the positive electrode material layer 12 may be provided on both surfaces of the positive electrode current collector 11, or the positive electrode material layer 12 may be provided on one surface of the positive electrode current collector 11. The positive electrode material layer 12 is preferably provided on both surfaces of the positive electrode current collector 11 in the positive electrode 1 from the viewpoint of further increasing the capacity of the secondary battery. The positive electrode current collector 11 does not have to have the positive electrode material layer on the entire surfaces of both surfaces or on the entire surface of one surface, and usually has a portion where the positive electrode material layer is not provided on both surfaces at both end portions of the positive electrode current collector 11 in the direction of the winding axis P and at both end portions thereof in a direction perpendicular to the direction of the winding axis P (that is, the winding direction or the longitudinal direction). The positive electrode current collector 11 may include a portion where the positive electrode material layer 12 is provided on both surfaces and a portion where the positive electrode material layer 12 is provided only on one surface. The positive electrode material layer 12 contains a positive electrode active material.

The negative electrode 2 is formed of at least a negative electrode material layer 22 and a negative electrode current collector (foil) 21, and the negative electrode material layer 22 may be provided on at least one surface of the negative electrode current collector 21. For example, in the negative electrode 2, the negative electrode material layer 22 may be provided on both surfaces of the negative electrode current collector 21, or the negative electrode material layer 22 may be provided on one surface of the negative electrode current collector 21. The negative electrode material layer 22 is preferably provided on both surfaces of the negative electrode current collector 21 in the negative electrode 2 from the viewpoint of further increasing the capacity of the secondary battery. The negative electrode current collector 21 does not have to have the negative electrode material layer on the entire surfaces of both surfaces or on the entire surface of one surface, and usually has a portion where the negative electrode material layer is not provided on both surfaces at both end portions of the negative electrode current collector 21 in the direction of the winding axis P and at both end portions thereof in a direction perpendicular to the direction of the winding axis P (that is, the winding direction or the longitudinal direction). The negative electrode current collector 21 may include a portion where the negative electrode material layer 22 is provided on both surfaces and a portion where the negative electrode material layer 22 is provided only on one surface. The negative electrode material layer contains a negative electrode active material.

The positive electrode active material contained in the positive electrode material layer 12 and the negative electrode active material contained in the negative electrode material layer 22 are substances directly involved in the transfer of electrons in the secondary battery, and are main substances of positive and negative electrodes responsible for charge and discharge, that is, a battery reaction. More specifically, ions are brought in the electrolyte due to the "positive electrode active material contained in the positive electrode material layer" and the "negative electrode active material contained in the negative electrode material layer", and such ions move between the positive electrode and the negative electrode to deliver and receive electrons, whereby charge and discharge are performed. The positive electrode 1 and the negative electrode 2 are preferably electrodes capable of occluding and releasing lithium ions, that is, the positive electrode material layer 12 and the negative electrode material layer 22 are preferably layers capable of occluding and releasing lithium ions. That is, a secondary battery in which lithium ions move between a positive electrode and a negative electrode with an electrolyte interposed therebetween whereby charge and discharge of the battery is made is preferable. When lithium ions are involved in charge and discharge, the secondary battery according to the present embodiment corresponds to a so-called "lithium ion battery".

The positive electrode active material of the positive electrode material layer 12 is made of, for example, a granular material, and it is preferable that a binder (also referred to as "binding material") is contained in the positive electrode material layer for sufficient contact between grains and shape retention. Furthermore, it is also preferable that a conductive assistant is contained in the positive electrode material layer to facilitate transmission of electrons promoting the battery reaction. Likewise, the negative electrode active material of the negative electrode material layer 22 is made of, for example, a granular material, and it is preferable that a binder is contained in the negative electrode material layer for sufficient contact between grains and shape retention, and a conductive assistant may be contained in the negative electrode material layer to facilitate transmission of electrons promoting the battery reaction. As described above, because a plurality of components are contained, the positive electrode material layer and the negative electrode material layer may also be referred to as "positive electrode mixture layer" and "negative electrode mixture layer", respectively.

The positive electrode active material is preferably a material that contributes to occlusion and release of lithium ions. From such a viewpoint, the positive electrode active material is preferably, for example, a lithium-containing composite oxide. More specifically, the positive electrode active material is preferably a lithium transition metal composite oxide containing lithium and at least one transition metal selected from the group consisting of cobalt, nickel, manganese, and iron. That is, in the positive electrode material layer of the secondary battery according to the present embodiment, such a lithium transition metal composite oxide is preferably contained as a positive electrode active material. For example, the positive electrode active material may be lithium cobalt oxide, lithium nickel oxide, lithium manganese oxide, lithium iron phosphate, or a material obtained by replacing a part of a transition metal thereof with another metal. Such a positive electrode active material may be contained as a single species, or two or more species may be contained in combination. In a more preferred aspect, the positive electrode active material contained in the positive electrode material layer is lithium cobalt oxide.

The binder that may be contained in the positive electrode material layer 12 is not particularly limited, and examples thereof include at least one selected from the group consisting of polyvinylidene fluoride, vinylidene fluoride-hexafluoropropylene copolymer, vinylidene fluoride-tetrafluoroethylene copolymer, polytetrafluoroethylene, and the like. The conductive assistant that may be contained in the positive electrode material layer is not particularly limited, and examples thereof include at least one selected from carbon blacks such as thermal black, furnace black, channel black, Ketjen black, and acetylene black, carbon fibers such as graphite, carbon nanotube, and vapor-grown carbon fiber, metal powders such as copper, nickel, aluminum, and silver, polyphenylene derivatives, and the like. In a more preferred aspect, the binder of the positive electrode material layer is polyvinylidene fluoride, and in another more preferable aspect, the conductive assistant of the positive electrode material layer is carbon black. In a further preferred aspect, the binder and the conductive assistant of the positive electrode material layer are a combination of polyvinylidene fluoride and carbon black.

The thickness of the positive electrode material layer 12 is not particularly limited, and may be, for example, 1 µm to 300 µm, particularly 5 µm to 200 µm. The thickness of the positive electrode material layer is the thickness inside the secondary battery, and an average value of measured values at 50 arbitrary points is used.

The negative electrode active material is preferably a material that contributes to occlusion and release of lithium ions. From such a viewpoint, the negative electrode active material is preferably, for example, a carbon material of every kind, an oxide, or a lithium alloy.

Examples of the carbon material of every kind of the negative electrode active material include graphite (natural graphite, artificial graphite), hard carbon, soft carbon, and diamond-like carbon. In particular, graphite is preferable because it has high electron conductivity and excellent adhesion to a negative electrode current collector. Examples of the oxide of the negative electrode active material include at least one selected from the group consisting of silicon oxide, tin oxide, indium oxide, zinc oxide, lithium oxide, and the like. The lithium alloy of the negative electrode active material may be any metal that may be alloyed with lithium, and may be, for example, a binary, ternary, or higher alloy of lithium and a metal such as Al, Si, Pb, Sn, In, Bi, Ag, Ba, Ca, Hg, Pd, Pt, Te, Zn, or La. Such an oxide is preferably amorphous as its structural form. This is because deterioration due to nonuniformity such as crystal grain boundaries or defects is less likely to occur. In a more preferred aspect, the negative electrode active material of the negative electrode material layer is artificial graphite.

The binder that may be contained in the negative electrode material layer 22 is not particularly limited, and examples thereof include at least one selected from the group consisting of styrene butadiene rubber, polyacrylic acid, polyvinylidene fluoride, a polyimide-based resin, and a polyamideimide-based resin. In a more preferred embodiment, the binder contained in the negative electrode material layer is styrene butadiene rubber. The conductive assistant that may be contained in the negative electrode material layer is not particularly limited, and examples thereof include at least one selected from carbon blacks such as thermal black, furnace black, channel black, Ketjen black, and acetylene black, carbon fibers such as graphite, carbon nanotube, and vapor-grown carbon fiber, metal powders such as copper, nickel, aluminum, and silver, polyphenylene derivatives, and the like. The negative electrode material layer may contain a component derived from a thickener component (for example, carboxymethyl cellulose) used at the time of manufacturing the battery.

In a more preferred embodiment, the negative electrode active material and the binder in the negative electrode material layer are a combination of artificial graphite and styrene-butadiene rubber.

The thickness of the negative electrode material layer 22 is not particularly limited, and may be, for example, 1 µm to 300 µm, particularly 5 µm to 200 µm. The thickness of the negative electrode material layer is the thickness inside the secondary battery, and an average value of measured values at 50 arbitrary points is used.

The positive electrode current collector 11 and the negative electrode current collector 21 used for the positive electrode 1 and the negative electrode 2 are members that contribute to collecting and supplying electrons generated in the active material due to the battery reaction. Such a current collector may be a sheet-like metal member or may have a porous or perforated form. For example, the current collector may be a metal foil, a punching metal, a net, an expanded metal, or the like. The positive electrode current collector 11 used for the positive electrode 1 is preferably made of a metal foil containing at least one selected from the group consisting of aluminum, stainless steel, nickel, and the like, and may be, for example, an aluminum foil. The negative electrode current collector 21 used for the negative electrode 2 is preferably made of a metal foil containing at least one selected from the group consisting of copper, stainless steel, nickel, and the like, and may be, for example, a copper foil.

The separator 3 is a member provided from the viewpoint of preventing short circuit due to contact between the positive and negative electrodes, holding the electrolyte, and the like. In other words, it can be said that the separator is a member that allows ions to pass while preventing electronic contact between the positive electrode and the negative electrode. Preferably, the separator is a porous or microporous insulating member, and has a membrane form due to its small thickness. Although it is merely an example, a microporous membrane formed of polyolefin may be used as the separator. In this regard, the microporous membrane used as the separator may contain, for example, only polyethylene (PE) or only polypropylene (PP) as polyolefin. Furthermore, the separator may be a laminated body including a "microporous membrane formed of PE" and a "microporous membrane formed of PP". The surface of the separator may be covered with an inorganic grain coating layer and/or an adhesive layer. The surface of the separator may have adhesiveness.

The thickness of the separator 3 is not particularly limited, and may be, for example, 1 µm to 100 µm, particularly 5 µm to 20 µm. The thickness of the separator is the thickness inside the secondary battery (in particular, the thickness between the positive electrode and the negative electrode), and the average value of the measured values at 50 arbitrary points is used.

The electrolyte assists movement of metal ions released from the electrodes (positive electrode and negative electrode). The electrolyte may be a "nonaqueous" electrolyte, such as an organic electrolyte or an organic solvent, or an "aqueous" electrolyte containing water. The secondary battery of the present invention is preferably a nonaqueous electrolyte secondary battery using an electrolyte containing a "nonaqueous" solvent as an electrolyte and a solute. The electrolyte may have a form such as a liquid form or a gel form (in the present specification, the "liquid" nonaqueous electrolyte is also referred to as a "nonaqueous electrolyte solution").

As a specific solvent of the nonaqueous electrolyte, a solvent containing at least a carbonate is preferable. Such carbonates may be a cyclic carbonate and/or a chain carbonate. Although not particularly limited, examples of the cyclic carbonate include at least one selected from the group consisting of propylene carbonate (PC), ethylene carbonate (EC), butylene carbonate (BC), and vinylene carbonate (VC). Examples of the chain carbonate include at least one selected from the group consisting of dimethyl carbonate (DMC), diethyl carbonate (DEC), ethyl methyl carbonate (EMC), and dipropyl carbonate (DPC). In one preferred embodiment of the present invention, a combination of a cyclic carbonate and a chain carbonate is used as the nonaqueous electrolyte, and for example, a mixture of ethylene carbonate and diethyl carbonate is used.

As a specific solute of the nonaqueous electrolyte, for example, a Li salt such as $LiPF_6$ or $LiBF_4$ is preferably used.

As the insulating tape 4, any insulating tape used in the field of secondary batteries may be used. The insulating tape 4 is an insulating tape having an adhesive layer on one surface (that is, a surface on the bottom extension portion 30 side), and may be formed of, for example, a polymer such as polyester (for example, polyethylene terephthalate), polyimide, polyamide, polyamideimide, or polyolefin (for example, polyethylene or polypropylene).

The exterior body 6 is usually a hard case, and includes two members such as a lid portion 61 and a main body portion 62. In a case where the exterior body 6 includes, for example, the lid portion 61 and the main body portion 62, the lid portion 61 and the main body portion 62 are sealed after the electrode assembly 5, the electrolyte, the current collecting tab 7, and the external terminal structure 8 as desired are housed. The sealing method is not particularly limited, and examples thereof include a laser irradiation method and the like. As a material constituting the lid portion 61 and the main body portion 62, any material that may constitute a hard case type exterior body in the field of secondary batteries may be used. Such a material may be a conductive material in which electron transfer may be achieved or an insulating material in which electron transfer may not be achieved. Examples of the conductive material include conductive materials such as aluminum, nickel, iron, copper, and stainless steel. Examples of the insulating material include insulating polymer materials such as polyester (for example, polyethylene terephthalate), polyimide, polyamide, polyamideimide, and polyolefin (for example, polyethylene or polypropylene). Both the lid 61 and the main body portion 62 are preferably formed of stainless steel. The dimensions of the lid portion 61 and the main body portion 62 are mainly determined according to the dimensions of the electrode assembly, and it is preferable that the lid portion 61 and the main body portion 62 have dimensions enough to prevent movement (for example, misalignment of the electrode assembly in the vertical direction, the horizontal direction, and the front and back direction in FIG. 2 and the like) of the electrode assembly in the exterior body when the electrode assembly is housed for example. By preventing the movement of the electrode assembly, the electrode assembly is prevented from being broken, and the safety of the secondary battery improves. The exterior body 6 may be a flexible case such as a pouch made of a laminate film.

The thickness of the exterior body 6 is not particularly limited, and may be, for example, 10 μm to 200 μm, particularly 40 μm to 100 μm. As the thickness of the exterior body, an average value of measured values at 50 arbitrary positions is used.

As the current collecting tab 7, any current collecting tab used in the field of secondary batteries may be used. Such a current collecting tab may be formed of a material from which electron transfer may be achieved and is usually formed of a conductive material such as aluminum, nickel, iron, copper, or stainless steel. The form of the current collecting tab is not particularly limited, and may be, for example, a linear shape or a plate shape. In FIG. 4, both the current collecting tabs 71 and 72 are disposed in the vicinity of the axis of the wound body obtained by winding. The current collecting tubs are not limited thereto, and each of the current collecting tabs may be independently disposed in the vicinity of the axis of the wound body, may be disposed in the vicinity of the outer periphery of the wound body, or may be disposed between the axis and the outer periphery of the wound body.

The conductive rivet portion 80 and the internal tab 82 in the external terminal structure 8 may be formed of a material from which electron transfer may be achieved and are usually formed of a conductive material such as aluminum, nickel, iron, copper, or stainless steel. The outer gasket portion 81 and the inner gasket portion 83 may be formed of a material from which electron transfer may not be achieved and are usually formed of an insulating polymer material such as polyester (for example, polyethylene terephthalate), polyimide, polyamide, polyamideimide, or polyolefin (for example, polyethylene or polypropylene).

As the spacer 9, any spacer used in the field of secondary batteries may be used. The spacer 9 is not particularly limited as long as it prevents, for example, electronic contact between the electrode assembly 5 (in particular, the electrode) and the exterior body (in particular, the external terminal structure 8). The material constituting the spacer 9 usually includes various insulating polymers such as polyolefin (polyethylene, polypropylene), polyester (polyethylene terephthalate, polybutylene terephthalate), and acrylic polymer. The spacer 9 may have any form as long as contact between the electrode assembly 5 (in particular, the electrode) and the exterior body (in particular, the external terminal structure 8) is prevented. For example, the spacer 9 may have a form of a film, a sheet, a board, or a fabric (for example, a nonwoven fabric).

Second Embodiment

A secondary battery 100B of the present embodiment is the same as the secondary battery 100A of the first embodiment except that it has the following features.

Figure 9:
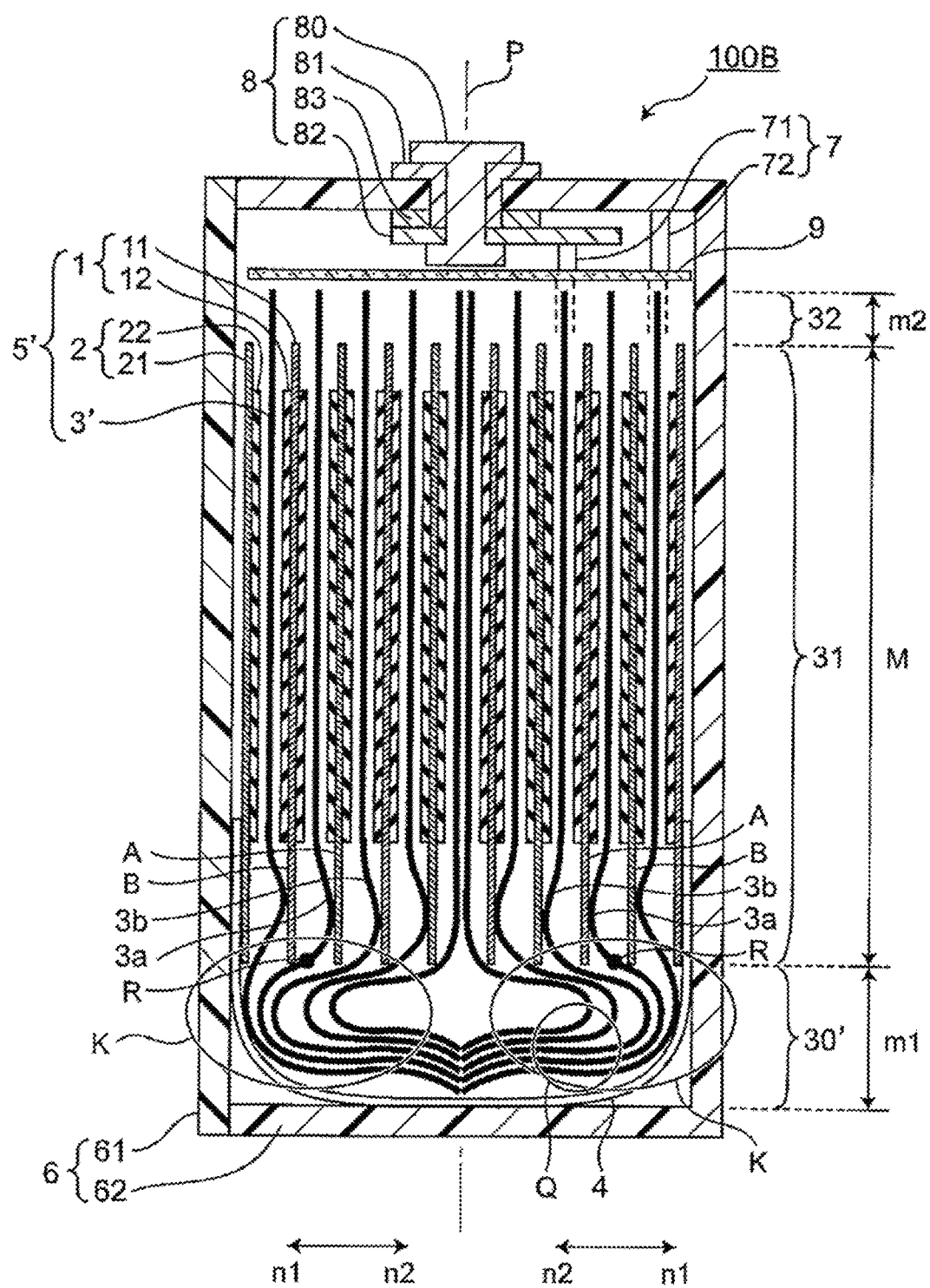
FIG. 9 is a schematic conceptual diagram of a secondary battery according to a second embodiment of the present invention, which is a schematic sectional view passing through the winding axis of the wound electrode assembly constituting the secondary battery in FIG. 1 in which a cross section taken along a line A-A is seen in a direction of the arrows.

As shown in FIG. 9, the separator 3 has a bent shape protruding toward the outer peripheral side n1 of the winding in an entire bottom extension portion 30' in a sectional view passing through the winding axis P and constitutes a flexible molded body as the bottom extension portion 30'.

The bottom extension portion 30' is the same as the bottom extension portion 30 of the first embodiment except that the separator 3' has a bent shape protruding toward the outer peripheral side n1 of the winding in the entire bottom extension portion 30'. The bottom extension portion 30' usually does not have the irregular region L as the bottom extension portion 30 does, but it does not mean that the bottom extension portion must not have the irregular region L, and the bottom extension portion may have the irregular region L at the tip of the separator 3.

The electrode assembly 5' is the same as the electrode assembly 5 of the first embodiment except that the bottom extension portion 30' as described above is provided instead of the bottom extension portion 30.

From the viewpoint of further improving the impact absorbability of the bottom extension portion 30' in the sectional view (in particular, the region K having the bent shape) passing through the winding axis P, as in the first embodiment, the separator 3' is preferably bent once toward the outer peripheral side n1 of the winding at the bottom extension portion 30', then bent toward the inner peripheral side n2, and then extended toward the inner peripheral side n2 beyond the boundary point R between the extension portion 30' and the main body portion 31 in the separator 3, as shown in FIG. 9.

The separator 3' is the same as the separator 3 in the first embodiment except that the separator 3' has a different shape as explained in the method for manufacturing the secondary battery 100B of the present embodiment described later.

In the secondary battery 100B of the present embodiment, the following effects are obtained in addition to the effects obtained in the secondary battery 100A of the first embodiment.

In the secondary battery 100B (in particular, the wound electrode assembly 5') of the present embodiment, as described above, the separator 3' has the bent shape protruding toward the outer peripheral side n1 of the winding in the entire bottom extension portion 30' in the sectional view passing through the winding axis P, and thus the impact absorption property of the bottom extension portion 30' further improves.

The method for manufacturing the secondary battery 100B of the present embodiment is the same as the method for manufacturing the secondary battery 100A of the first embodiment except for having the following features.

As a separator, the separator 3' having a shape different from that of the separator 3 of the first embodiment is used. The shape is a plan view shape, and is, for example, a top view shape when placed on a surface having the maximum area.

Figure 10:
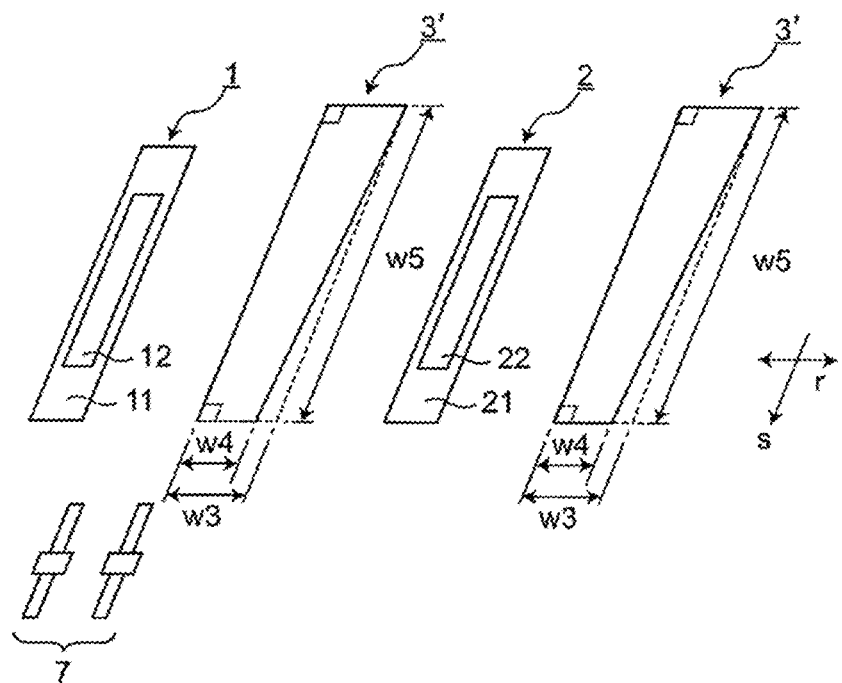
FIG. 10 is a schematic perspective view for explaining constituent members of the wound electrode assembly constituting the secondary battery according to the second embodiment of the present invention.

As shown in FIG. 10, the separator 3' is a separator in which the length in the widthwise direction r is gradually reduced in the longitudinal direction s and may have a trapezoidal shape. FIG. 10 is a schematic perspective view for explaining constituent members of a wound electrode assembly constituting a secondary battery according to the second embodiment of the present invention.

The size of the separator 3' used is not particularly limited as long as the desired electrode assembly 5' is obtained. For example, a length w3 (see FIG. 10) of the long side in the widthwise direction r of the separator 3' is usually 105% to 300%, and particularly 110% to 300% with respect to the length M in the direction of winding axis of the main body portion 31 of the separator 3' in the intended electrode assembly 5'. A length w4 (see FIG. 10) of the short side in the width direction r of the separator 3' is usually 100% to 300%, and particularly 105% to 250% with respect to the length M in the direction of winding axis of the main body portion 31 of the separator 3' in the intended electrode assembly 5'. Further, for example, the length w4 (see FIG. 10) of the separator 3' in the longitudinal direction s may be appropriately determined according to the size of the intended secondary battery (in particular, the number of windings of the electrode assembly 5').

Figure 11:
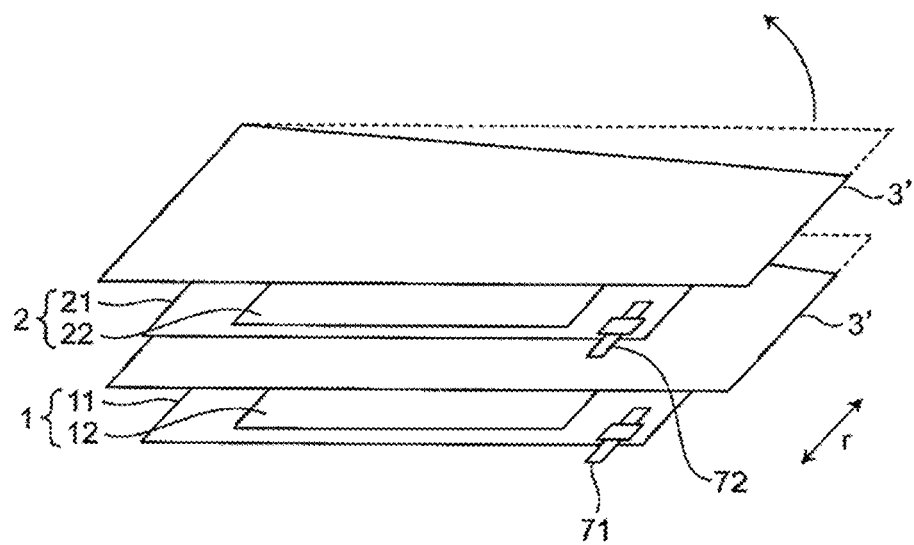
FIG. 11 is a schematic perspective view for explaining a winding method of the wound electrode assembly constituting the secondary battery according to the second embodiment of the present invention.
Figure 12:
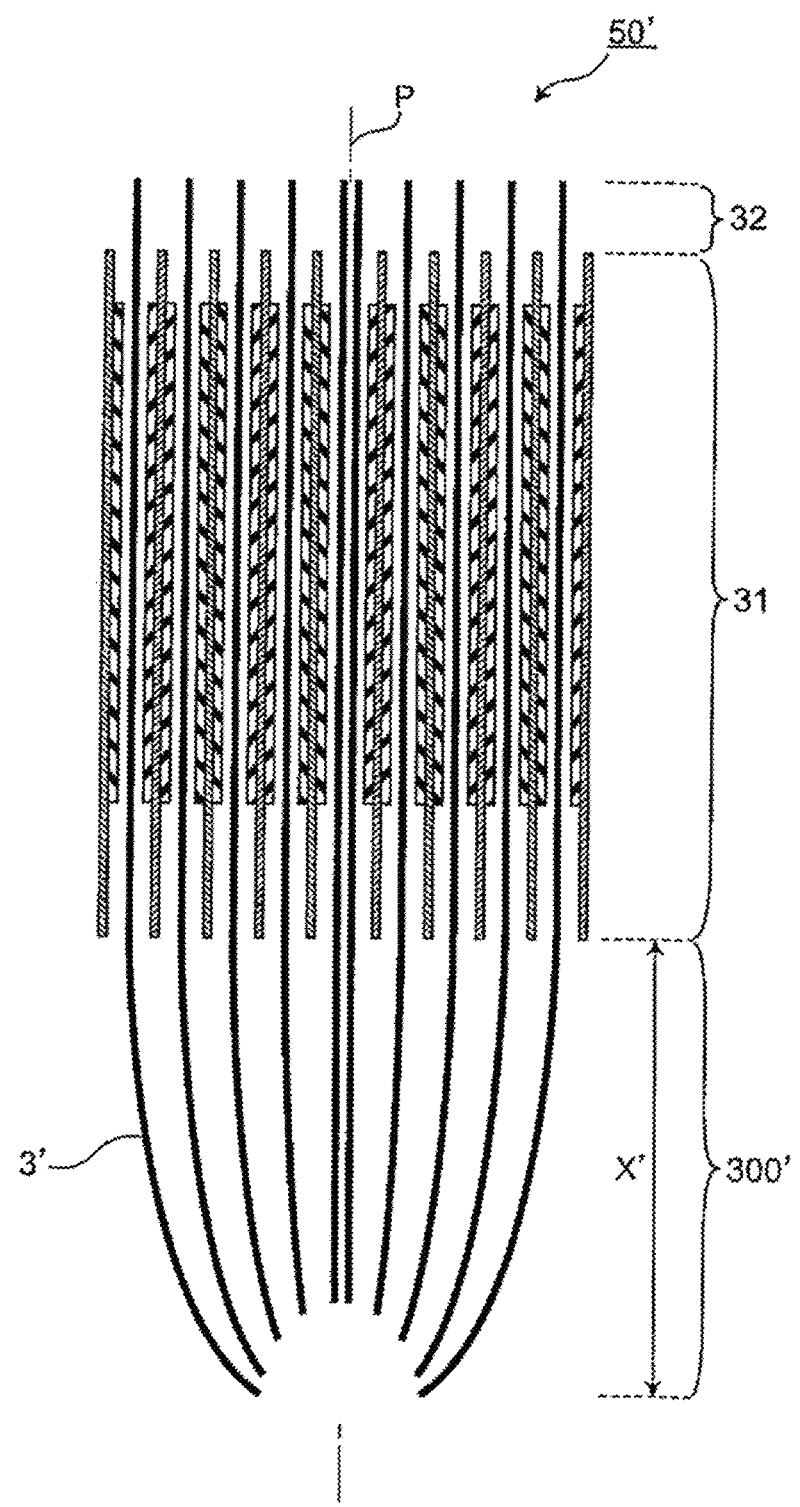
FIG. 12 is a schematic sectional view for explaining a precursor of the wound electrode assembly constituting the secondary battery according to the second embodiment of the present invention.

In the winding step, as shown in FIG. 11, the separator 3' is used in the following method to obtain a precursor 50' of the electrode assembly as shown in FIG. 12:

The winding is started from an end portion of the separator 3' having a relatively short length in the widthwise direction r.

FIG. 11 is a schematic perspective view for explaining a winding method of the wound electrode assembly constituting the secondary battery according to the second embodiment of the present invention.

FIG. 12 is a schematic sectional view for explaining a precursor of the wound electrode assembly constituting the secondary battery according to the second embodiment of the present invention.

At the time of winding, by applying a predetermined tension similar to that in the first embodiment to the separator 3', the precursor 50' in which the separator 3' approaches (or converges on) the winding axis P toward its tip in a separator extension portion 300' is obtained. In the separator extension portion 300' of the electrode assembly precursor 50', the length x' of the separator 3' in the direction of winding axis P is gradually decreased toward the winding axis P in the winding direction.

Figure 13:
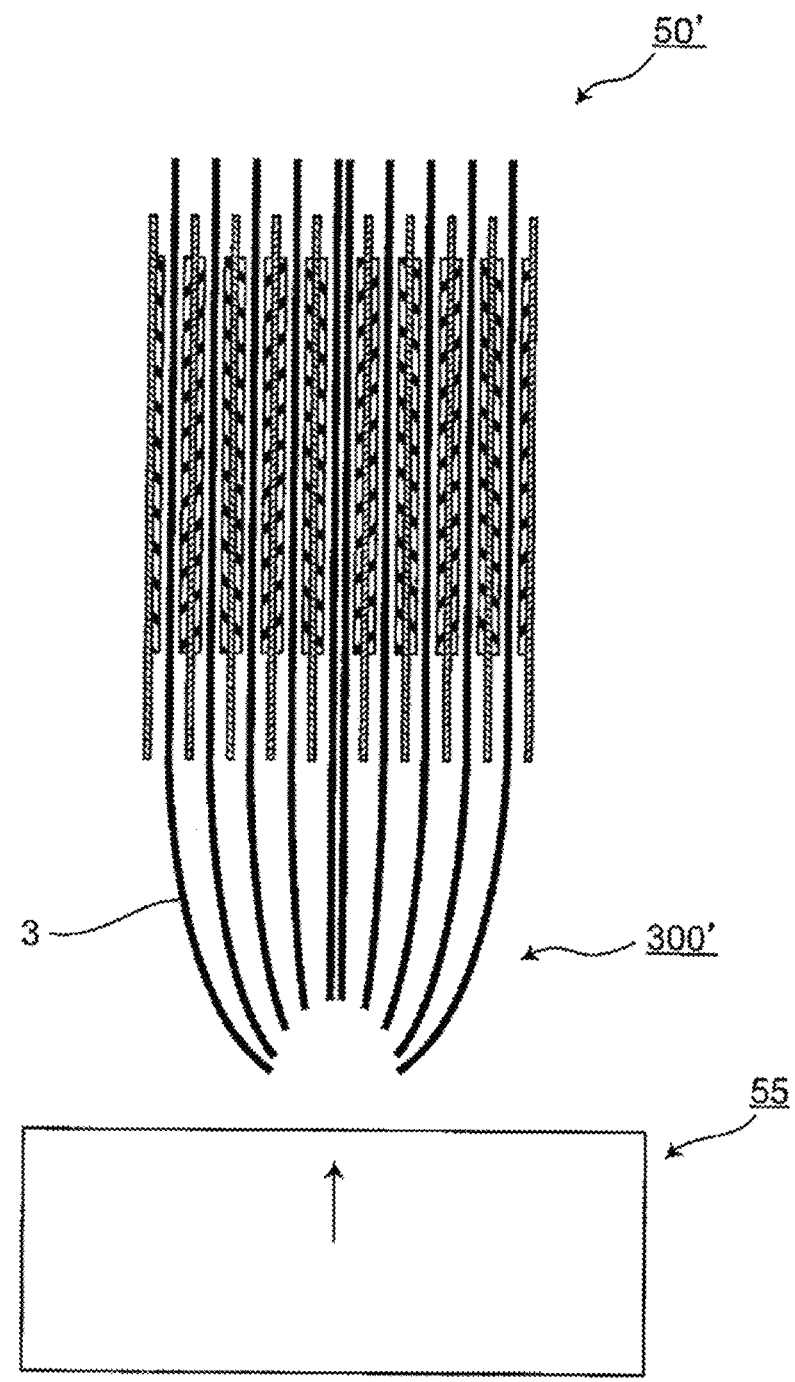
FIG. 13 is a schematic sectional view for explaining a method for manufacturing the wound electrode assembly constituting the secondary battery according to the second embodiment of the present invention.
Figure 14:
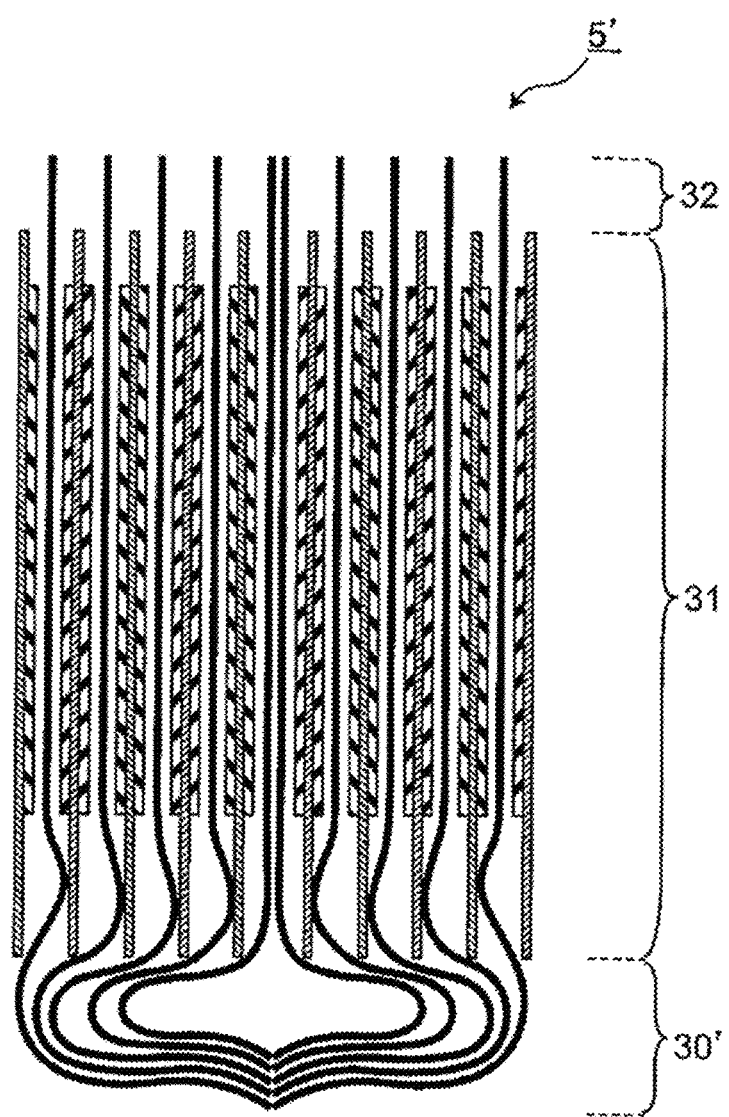
FIG. 14 is a schematic sectional view for explaining the wound electrode assembly constituting the secondary battery according to the second embodiment of the present invention.

In the molding step, as shown in FIG. 13, in the precursor 50', the heater block 55 is brought into contact with the separator extension portion 300' in which the separator 3' extends more than the positive electrode and the negative electrode in the direction of winding axis to mold the separator extension portion 300', thereby obtaining the wound electrode assembly 5' as shown in FIG. 14. At this time, the heater block 55 is brought into contact with the separator extension portion 300' until the separator extension portion 300' has a flexure. As a result, because the separator 3' melts while being appropriately deformed in the separator extension portion 300', it is possible to shape the separator extension portion 300' softly (that is, soft shaping). As a result, the electrode assembly 5' in which the separator 3' includes the bottom extension portion 30' having the bent shape as described above can be obtained. The resulting bottom extension portion 30' includes a flexible molded body. For example, when a precursor in which the separator 3' does not approach (or converge on) the winding axis P toward the tip of the separator 3' in the separator extension portion is used, the separator 3' cannot form the bottom extension portion 30' having the bent shape as described above, and as a result, a flexible molded body cannot be obtained as the bottom extension portion 30'. Further, for example, when a heater (for example, a fan heater, an electric heating wire, or the like) other than the heater block is used, the separator 3' cannot form the bottom extension portion 30' having the bent shape as described above, and as a result, a flexible molded body cannot be obtained as the bottom extension portion 30'. FIG. 13 is a schematic sectional view for explaining a method for manufacturing a wound electrode assembly constituting the secondary battery according to the second embodiment of the present invention (in particular, a molding step). FIG. 14 is a schematic sectional view for explaining the wound electrode assembly constituting the secondary battery according to the second embodiment of the present invention.

The surface temperature of the heater block 55 is the same as the surface temperature of the heater block 55 in the manufacturing method of the first embodiment. When the surface temperature of the heater block is too high, melting of the separator 3' starts before the separator 3 bends when the heater block 55 approaches the separator extension portion 300', then the separator 3' cannot form the bottom extension portion 30' having the bent shape as described above, and as a result, a flexible molded body cannot be obtained. When the surface temperature of the heater block is too low, fusion between the separators 3' does not proceed, then the separator 3' cannot form the bottom extension portion 30' having the bent shape as described above, and as a result, a flexible molded body cannot be obtained.

Figure 15:
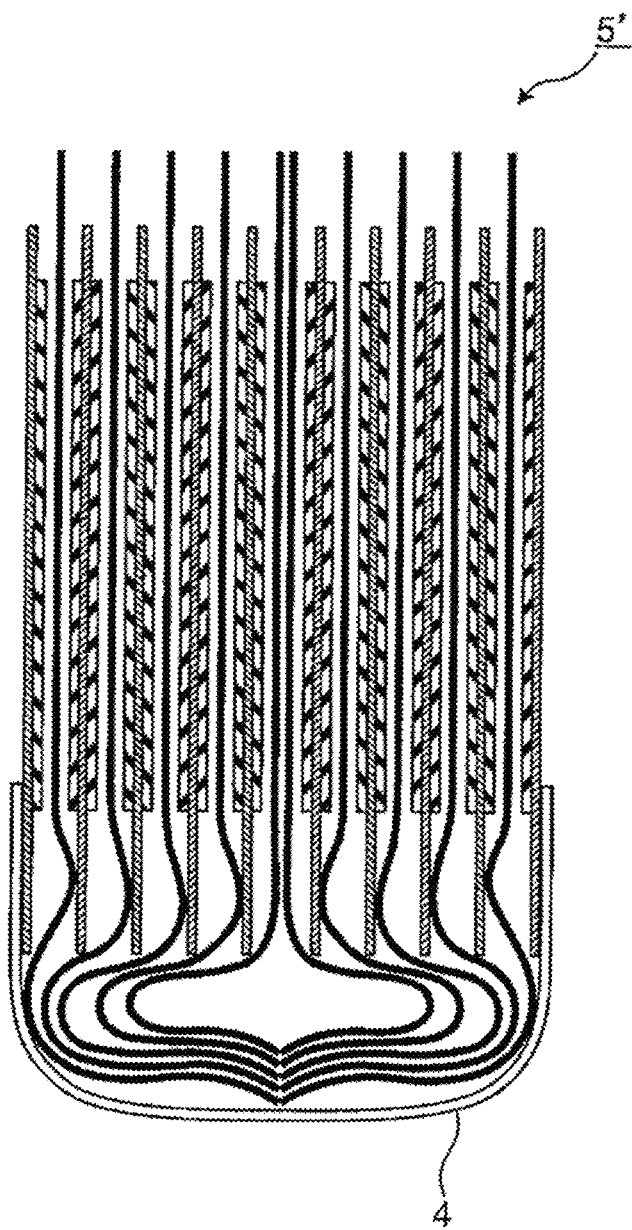
FIG. 15 is a schematic sectional view for explaining a wound electrode assembly with an insulating tape constituting the secondary battery according to the second embodiment of the present invention.
Figure 16:
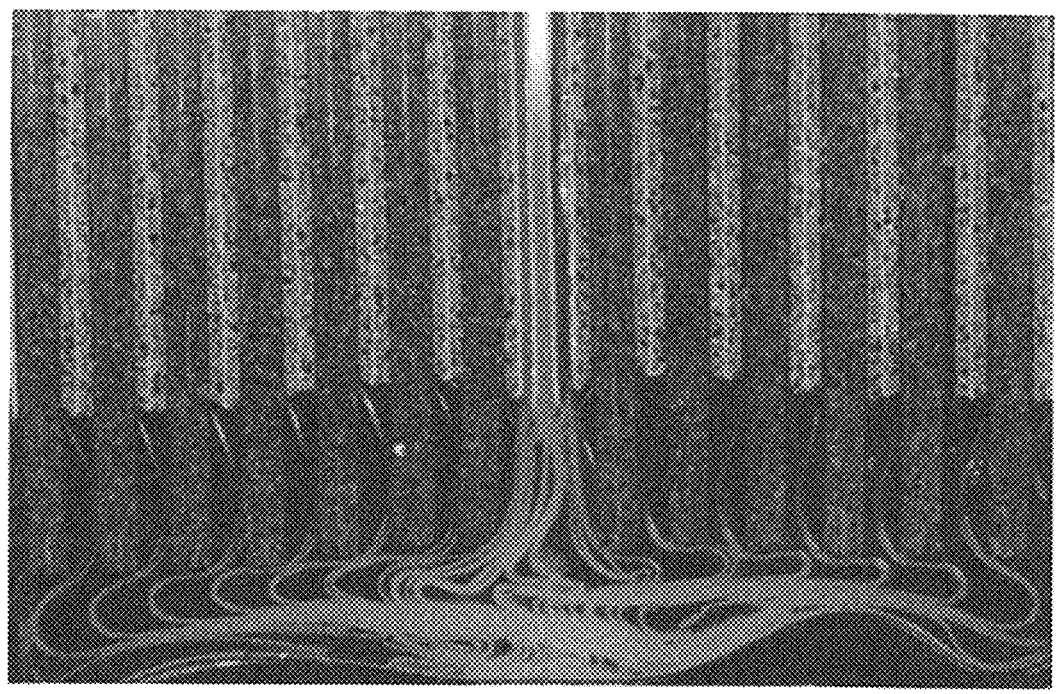
FIG. 16 is a micrograph of a vicinity of a bottom extension portion in the secondary battery according to the first embodiment of the present invention.

As shown in FIG. 15, the insulating tape 4 is usually attached to the separator extension portion 30' of the electrode assembly 5'. At this time, it is extremely easy to attach the insulating tape 4 because the bottom extension portion 30' is formed as a flexible molded body. Moreover, not only short circuit between the positive electrode and the negative electrode due to impact can be more reliably prevented, but also a risk of exposure of the electrode in the secondary battery and a risk of catching of the separator between the constituent members of the exterior body can be more sufficiently reduced. FIG. 15 is a schematic sectional view for explaining a wound electrode assembly with an insulating tape constituting the secondary battery according to the second embodiment of the present invention.

The secondary battery according to the present invention may be used in various fields where power storage is assumed. Although it is merely an example, the secondary battery according to the present invention, particularly the nonaqueous electrolyte secondary battery, may be used in the fields of electricity, information, and communication in which mobile devices and the like are used (for example, electric and electronic equipment fields or mobile equipment fields including mobile phones, smart phones, smartwatches, notebook computers, digital cameras, activity meters, arm computers, electronic papers, RFID tags, small electronic machines such as card-type electronic money, and the like), home and small industrial applications (for example, the fields of electric tools, golf carts, and home, nursing, and industrial robots), large industrial applications (for example, fields of forklift, elevator, and harbor crane), transportation system fields (for example, the field of hybrid vehicles, electric vehicles, buses, trains, power-assisted bicycles, electric two-wheeled vehicles, and the like), power system applications (for example, fields such as various types of power generation, road conditioners, smart grids, and household power storage systems), medical applications (medical equipment fields such as hearing aid earbuds), pharmaceutical applications (fields such as dosage management systems), IoT fields, space and deep sea applications (for example, fields such as a space probe and a research submersible), and the like.

DESCRIPTION OF REFERENCE SYMBOLS

1: Positive electrode
2: Negative electrode
3: Separator
4: Insulating tape
5: Electrode assembly
6: Exterior body
7: Current collecting tab
8: External terminal structure
9: Spacer
11: Positive electrode current collector
12: Positive electrode material layer
21: Negative electrode current collector
22: Negative electrode material layer
30: 30': Bottom extension portion of separator
31: Main body portion 31 of separator
32: Top extension portion of separator
61: Exterior body lid portion
62: Exterior body main body portion
80: Conductive rivet portion
81: Outer gasket portion
82: Internal tab
83: Internal gasket portion
100: 100A: 100B: Secondary battery

The invention claimed is:

1. A secondary battery comprising:
    a wound electrode assembly in which a positive electrode, a negative electrode, and a separator disposed between the positive electrode and the negative electrode are wound about a winding axis; and
    a current collecting tab at a first end of the wound electrode assembly along a direction of the winding axis,
    wherein the wound electrode assembly has a separator extension portion in which the separator extends more than the positive electrode and the negative electrode toward a second end of the wound electrode assembly along the direction of the winding axis, the second end being opposite the first end,
    the separator has a bent shape that protrudes toward an outer peripheral side of the wound electrode assembly at least at a part of the separator extension portion in a sectional view passing through the winding axis, and
    wherein the bent shape is a shape in which the separator is, in the separator extension portion, firstly bent toward the outer peripheral side of the wound electrode assembly and then secondly bent toward an inner peripheral side of the wound electrode assembly in a direction toward a tip of the separator.

2. The secondary battery according to claim 1, wherein the bend is a curvature that bends in an arcuate shape.

3. The secondary battery according to claim 1, wherein the separator includes the extension portion having the bent shape and a main body portion disposed between the positive electrode and the negative electrode, and
    in the separator extension portion, the bent shape of the separator extends toward the inner peripheral side beyond a boundary point between the extension portion and the main body portion in the sectional view passing through the winding axis.

4. The secondary battery according to claim 3, wherein the separator further extends beyond the winding axis in the sectional view passing through the winding axis.

5. The secondary battery according to claim 1, wherein the separator is further thirdly bent toward the outer peripheral side in the separator extension portion in the sectional view passing through the winding axis.

6. The secondary battery according to claim 5, wherein a portion where the separator is further thirdly bent toward the outer peripheral side in the sectional view passing through the winding axis is on a side opposite to a side where the boundary point is present with respect to the winding axis.

7. The secondary battery according to claim 1, wherein the separator includes the extension portion having the bent shape and a main body portion between the positive electrode and the negative electrode, and
    the bent shape of the separator extends toward the outer peripheral side of the wound electrode assembly at a boundary between the extension portion and the main body portion.

8. The secondary battery according to claim 7, wherein the extension portion having the bent shape in the separator has a length m1 in an axial direction, the length m1 being 2% to 15% with respect to a length M of the main body portion in the axial direction.

9. The secondary battery according to claim 1, wherein
   the wound electrode assembly includes a plurality of the separators in the sectional view passing through the winding axis, and
   the plurality of separators are arranged to overlap each other along the direction of the winding axis of the wound electrode assembly in a region having the bent shape in the extension portion.

10. The secondary battery according to claim 1, wherein the wound electrode assembly includes an insulating tape attached to the extension portion having the bent shape.

11. The secondary battery according to claim 1, wherein the extension portion having the bent shape is an impact absorbing material.

12. The secondary battery according to claim 1, wherein the wound electrode assembly, the current collecting tab, and an electrolyte are enclosed in an exterior body.

13. The secondary battery according to claim 12, wherein the exterior body comprises a conductive material.

14. The secondary battery according to claim 13, wherein
   the current collecting tab includes a positive electrode current collecting tab and a negative electrode current collecting tab,
   one of the positive electrode current collecting tab and the negative electrode current collecting tab is electrically connected to an inside of the exterior body, and
   the exterior body has a same polarity same as that of the current collecting tab in contact with the inside of the exterior body.

15. The secondary battery according to claim 14, wherein the exterior body has negative polarity.

16. The secondary battery according to claim 12, wherein the electrolyte is a nonaqueous electrolyte.

17. The secondary battery according to claim 1, wherein the positive electrode and the negative electrode are electrodes capable of occluding and releasing lithium ions.

18. A method for manufacturing a secondary battery, the method comprising:
   in a precursor of a wound electrode assembly obtained by winding a positive electrode about a winding axis, a negative electrode, and a separator disposed between the positive electrode and the negative electrode, bringing a heater block into contact along an axial direction of the precursor of the wound electrode assembly with a separator extension portion in which the separator extends more than the positive electrode and the negative electrode so that the separator has a bent shape that protrudes toward an outer peripheral side of the wound electrode assembly at least at a part of the separator extension portion in a sectional view passing through the winding axis, wherein the bent shape is a shape in which the separator is, in the separator extension portion, firstly bent toward the outer peripheral side of the wound electrode assembly and then secondly bent toward an inner peripheral side of the wound electrode assembly in a direction toward a tip of the separator.

19. The method for manufacturing a secondary battery according to claim 18, wherein the heater block is brought into contact with the separator extension portion to an extent that the separator extension portion has a flexure.

20. The method for manufacturing a secondary battery according to claim 18, wherein the heater block has a surface temperature of Mp−30° C. to Mp+30° C., where Mp (° C.) is a melting point of a polymer material of the separator.

* * * * *